(12) United States Patent
Shiozaki

(10) Patent No.: US 9,303,730 B2
(45) Date of Patent: Apr. 5, 2016

(54) TWIN CLUTCH TYPE TRANSMISSION

(75) Inventor: Tomoo Shiozaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1554 days.

(21) Appl. No.: 11/905,177

(22) Filed: Sep. 27, 2007

(65) Prior Publication Data

US 2008/0087119 A1    Apr. 17, 2008

(30) Foreign Application Priority Data

Sep. 29, 2006   (JP) ................... 2006-270102

(51) Int. Cl.

| F16D 25/02 | (2006.01) |
|---|---|
| F16D 25/10 | (2006.01) |
| F16H 3/00 | (2006.01) |
| F16D 25/12 | (2006.01) |
| F16H 57/021 | (2012.01) |
| F16H 57/02 | (2012.01) |
| F16H 61/00 | (2006.01) |

(52) U.S. Cl.
CPC ............... *F16H 3/006* (2013.01); *F16D 25/10* (2013.01); *F16D 25/12* (2013.01); *F16H 57/021* (2013.01); *F16H 2057/0203* (2013.01); *F16H 2061/0046* (2013.01); *Y10T 74/19228* (2015.01)

(58) Field of Classification Search
CPC ............................. F16H 57/021; F16H 57/025
USPC ..................... 192/48.611, 85.25; 384/441
See application file for complete search history.

(56) References Cited

U.S. PATENT DOCUMENTS

| 2,072,057 | A |   | 2/1937  | Rauen |
| 2,506,670 | A | * | 5/1950  | Kamlukin ....................... 74/359 |
| 2,701,476 | A | * | 2/1955  | Keese ............................. 74/342 |
| 3,823,802 | A | * | 7/1974  | Winzeler et al. ........... 192/106 F |
| 3,862,672 | A | * | 1/1975  | Tappen ................... F16H 57/021 184/6.12 |
| 4,412,705 | A | * | 11/1983 | Schreiner ............... F16C 35/077 384/584 |
| 4,603,596 | A | * | 8/1986  | Akashi et al. ................ 74/336 R |
| 5,478,284 | A |   | 12/1995 | Imaida et al. |
| 6,106,155 | A | * | 8/2000  | Beyfuss et al. ................ 384/537 |
| 8,196,485 | B2 | * | 6/2012 | Kanno et al. ..................... 74/330 |
| 8,327,988 | B2 | * | 12/2012 | Ogasawara ............. 192/48.611 |
| 2005/0087420 | A1 | * | 4/2005 | Schafer et al. ............. 192/55.61 |
| 2005/0211007 | A1 | * | 9/2005 | Suzuki et al. .................... 74/340 |

(Continued)

FOREIGN PATENT DOCUMENTS

| EP | 1 522 762 A2 | 4/2005 |
| FR | 2 180 679 A2 | 11/1973 |

(Continued)

*Primary Examiner* — Robert Hodge
*Assistant Examiner* — Ryan Dodd
(74) *Attorney, Agent, or Firm* — Birch, Stewart, Kolasch & Birch, LLP

(57) ABSTRACT

A twin clutch type transmission connected to an engine of a vehicle and the like in which an end portion of the main shaft is held in the secure and compact manner to contribute to efficient operation of the transmission. In the twin clutch type transmission, the first and second hydraulic disk clutches are coaxially provided to be adjacent with each other, and the inner and outer shafts of the main shaft as a coaxial dual structure are connected to the respective disk clutches coaxially. The ball bearing fixed to the transmission case with the holder plate pierces the left end portion of the inner shaft so as to be supported, and further to be tightened and fixed to the ball bearing with the locknut screwed with the leading end of the left end portion.

12 Claims, 19 Drawing Sheets

(56) References Cited

U.S. PATENT DOCUMENTS

2007/0144856 A1\* 6/2007 Ieda et al. .................. 192/48.8
2010/0072019 A1\* 3/2010 Ogasawara ............. 192/48.611

FOREIGN PATENT DOCUMENTS

| | | |
|---|---|---|
| FR | 2883061 A1 | 9/2006 |
| GB | 2 119 459 A | 11/1983 |
| JP | 58-094669 A | 6/1983 |
| JP | 5-157156 A | 6/1993 |
| JP | 10-19109 A | 1/1998 |
| JP | 10-103420 A | 4/1998 |
| JP | 11-153213 A | 6/1999 |
| JP | 2000-097297 A | 4/2000 |
| JP | 2005-273829 A | 10/2005 |

\* cited by examiner

| AREA | FIRST SWITCH | SECOND SWITCH |
|---|---|---|
| STOP | ON | ON |
| CCW CORRECTION | OFF | ON |
| FEED | OFF | OFF |
| CW CORRECTION | ON | OFF |

| AREA | MOTOR TORQUE |
|---|---|
| STOP | 0 |
| CCW CORRECTION | $-Tmin$ |
| FEED | $\pm Tmax$ |
| CW CORRECTION | $+Tmin$ |

TWIN CLUTCH TYPE TRANSMISSION

CROSS-REFERENCE TO RELATED APPLICATIONS

The present application claims priority under 35 USC 119 to Japanese Patent Application No. 2006-270102 filed on Sep. 29, 2006 the entire contents of which are hereby incorporated by reference.

BACKGROUND OF THE INVENTION

1. Field of the Invention

The present invention relates to a twin clutch type transmission connected to an engine of a vehicle.

2. Description of Background Art

Generally, a twin clutch type transmission includes first and second hydraulic disk clutches which are coaxially arranged by axially displacing the pressure member under the externally supplied hydraulic pressure to generate a predetermined engaging force such that first and second main shafts which form a coaxial dual structure are coaxially connected to the disk clutches, respectively. See, for example, JP-A No. 2000-97297.

In the case where a compact engine at a high revolution speed is operated at a relatively high engine speed likewise the engine for a motorcycle, the aforementioned generally employed art is required to securely support the first and the second main shafts by allowing a reliable gear shifting function as well as maintaining the engine compact.

The problem to be solved by the present invention is to securely support the end portion of the main shaft of the twin clutch type transmission connected to the engine of the vehicle while keeping the structure compact so as to contribute to the efficient operation of the transmission.

SUMMARY AND OBJECTS OF THE INVENTION

As the means for solving the problem, an embodiment of the present invention provides a twin clutch type transmission 23 connected to an engine 13 and first and second hydraulic disk clutches 51a, 51b for generating a predetermined engagement force by displacing a pressure member 52a, 52d under an externally supplied oil pressure in an axial direction are coaxially provided to be adjacent with each other. First and second main shafts 43, 44 form a coaxial dual structure and are coaxially connected to the respective disk clutches. A bearing 73 is fixed to a transmission case 22 with a that pierces an end portion of an inner portion of the main shafts so as to be supported and further to be tightened and fixed to the bearing with a nut 74 screwed with a leading end of the end portion.

In an embodiment of the present invention, the holder plate 75 for the bearing fixes a bearing 82 which supports an end portion of a counter shaft 29 in parallel with the main shafts 43, 44 to the transmission case 22.

In an embodiment of the present invention, the nut screwed with the inner main shaft is covered with a cap 76 from outside of the transmission case.

In an embodiment of the present invention, the disk clutch includes an oil pressure chamber at an engagement side 54a, 54b which applies a pressing force directed to a clutch engagement side to the pressure member, and a pressure compensation oil pressure chamber 55a, 55b which applies the pressing force directed to a clutch disengagement side to the pressure member to compensate for pressure caused by a return operation. A plurality of in-shaft oil passages 115, 116, 117 are in communication with one of the oil pressure chambers and are formed at one side of the inner main shaft. The in-shaft oil passages are arranged in an order for the oil pressure chamber at an engagement side, the pressure compensation oil pressure chamber, and the oil pressure at the engagement side from a center of the main shafts.

In an embodiment of the present invention, when the main shafts which form the coaxial dual structure are installed to a transmission case, the end portion of the inner main shaft is rotatably supported via the bearing, and the outer main shaft is installed while restricting its axial movement so as to allow for an easy installment of the main shafts to the transmission case as well as to securely hold the end portions of the shafts in the transmission case in a simple and compact manner.

In an embodiment of the present invention, the bearing 73 for the inner main shaft 43 and the bearing 82 for the counter shaft 29 may be fixed to the transmission case 22 using the same holder plate 75 so as to reduce the number of parts and the man-hour for assembly.

In an embodiment of the present invention, the through hole formed in the end portion of the shaft in the transmission case may be sealed while allowing the nut to be tightened from the outside the transmission case.

In an embodiment of the present invention, the in-shaft oil passages for the oil pressure chamber at the engagement side which become relatively high pressure may be set apart from each other such that the in-shaft oil passage for the pressure compensation oil pressure chamber at relatively low pressure is interposed between those in-shaft oil passages. This makes it possible to disperse the pressure rise within the main shafts to realize an appropriate pressure, thus contributing to the efficient operation of the transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
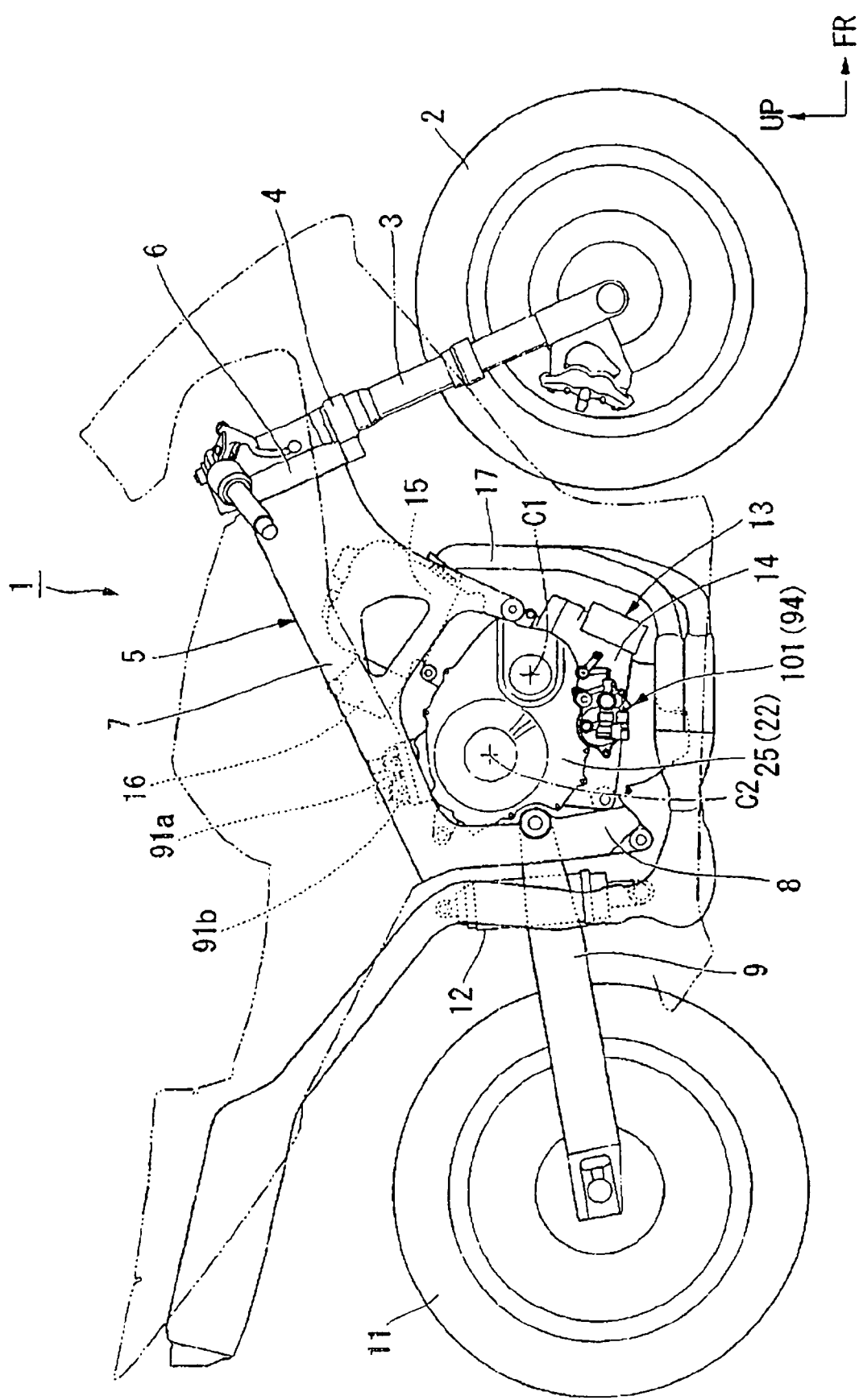
FIG. 1 is a right side view of a motorcycle according to an embodiment of the present invention.

An embodiment of the present invention will be described referring to the drawings. The front-to-rear direction and the left-to-right direction will coincide with those of the vehicle unless otherwise specified. The arrow FR denotes the front of the vehicle, the arrow LH denotes the left of the vehicle, and the arrow UP denotes the upward of the vehicle, respectively.

Referring to FIG. 1, an upper portion of a front fork 3 which journals a front wheel 2 of a motorcycle (saddle-ride type vehicle) 1 is pivotally supported at a head pipe 6 at a front end portion of a vehicle body frame 5 steerably via a steering stem 4. A main frame 7 extends rearwardly from the head pipe 6 so as to be linked with a pivot plate 8. A front end of a swing arm 9 is pivotally supported at the pivot plate 8 such that the front end portion of the swing arm 9 is swingable in the vertical direction. A rear wheel 11 is journaled to the rear end portion of the swing arm 9. A shock absorber 12 is interposed between the swing arm 9 and a vehicle body frame 5. The vehicle body frame 5 has an engine (internal combustion engine) 13 as a motor for the motorcycle 1 mounted thereon.

Figure 2:
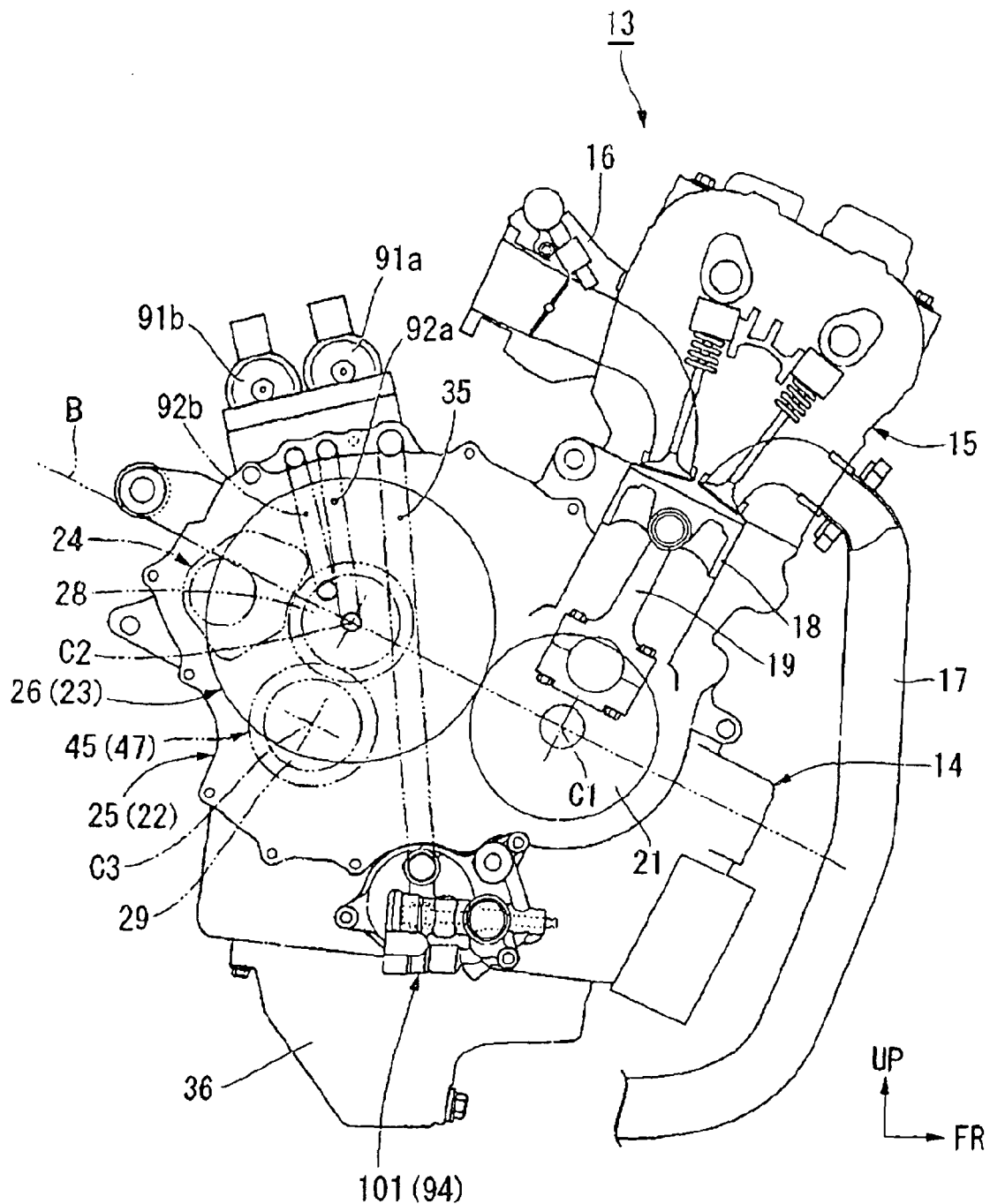
FIG. 2 is a right side view of an engine of the motorcycle.

Referring to FIG. 2, the engine 13 is a parallel 4-cylinder engine having a crankshaft axis C1 set along the vehicle width (lateral) direction. A cylinder portion 15 is provided on a crank case 14, and has a rear end connected to a throttle body 16 of the intake system, and has a front end connected to an exhaust pipe 17, respectively. Pistons 18 corresponding to the respective cylinders are reciprocably inserted into the cylinder 15 such that the reciprocating operation of the piston 18 is converted into the rotation of the crankshaft 21.

Figure 3:
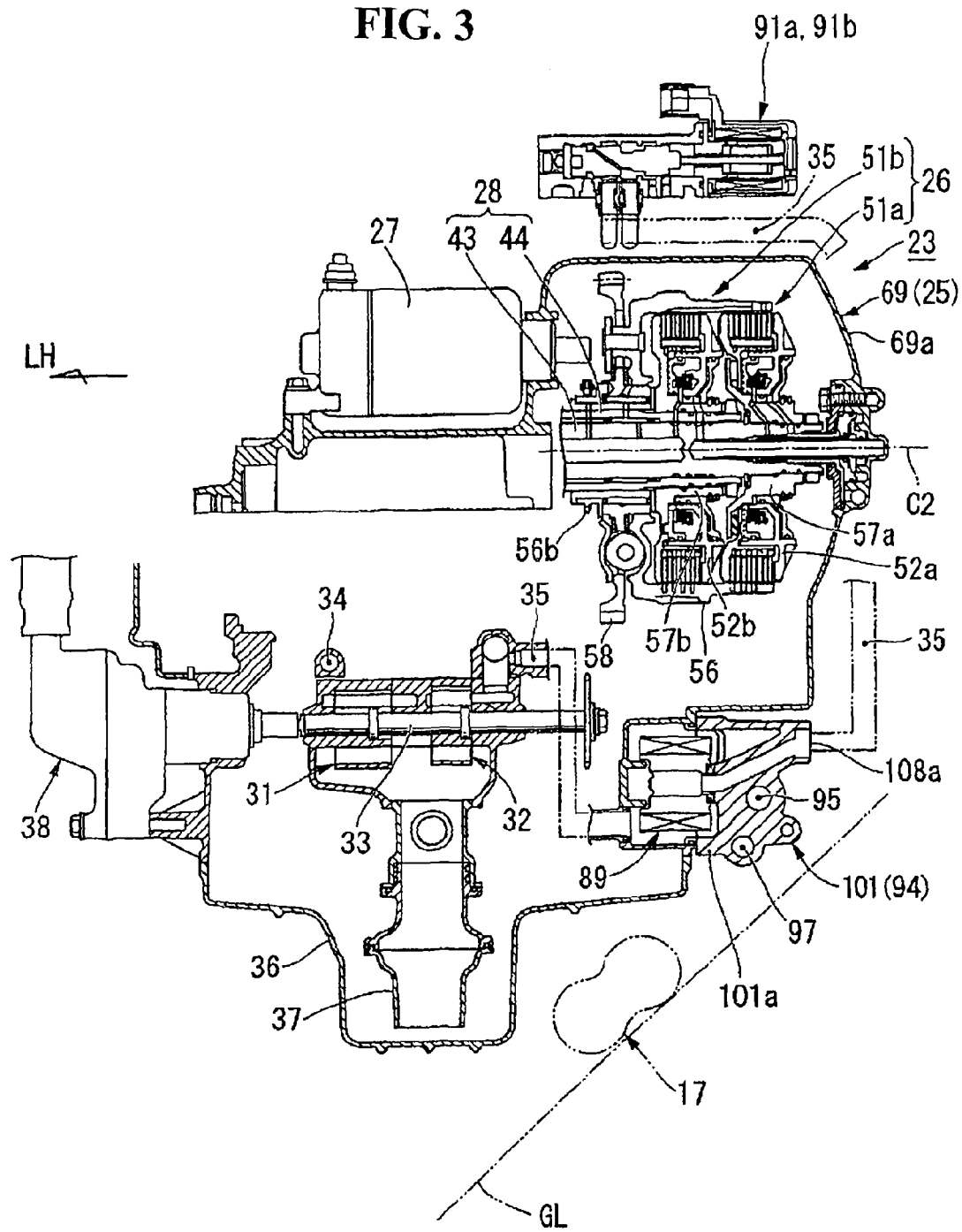
FIG. 3 is a development sectional view showing an essential portion of the engine in parallel with a lateral direction.

Referring to FIG. 3, a transmission case 22 is integrally provided to the rear of the crank case 14 so as to store a twin clutch type transmission 23 and a change mechanism 24 therein. A right side of the transmission case 22 forms a clutch case 25 which stores a twin clutch 26 of the twin clutch type transmission 23 therein. A starter motor 27 is disposed on the transmission case 22 (see FIG. 3). The rotating power of the crankshaft 21 is output to the left side of the transmission case 22 via the twin clutch type transmission 23, and further transmitted to the rear wheel 11 via a chain type power transmission mechanism, for example.

Referring to FIG. 2, the engine 13 includes three main shafts, that is, the crankshaft 21, a main shaft 28 and a counter shaft 29 in parallel with the crankshaft 21 of the twin clutch type transmission 23 which are arranged to form the triangular configuration. More specifically, the axes C1 and C2 of the crankshaft 21 and the main shaft 28 are above the vertically parted plane B having the rear portion higher than the front portion in the crank case 14. The axis C3 of the counter shaft 29 is below the parted plane B to the rear of the crankshaft 21. The longitudinal length of the engine 13 may be reduced to improve the freedom degree in the layout. The change mechanism 24 is disposed substantially above the main shaft 28 to the rear thereof.

Referring to FIG. 3, first and second oil pumps 31 and 32 are disposed inside the crank case 14 at the lower portion, which share a drive shaft 33 extending along the lateral direction. The first oil pump 31 is used for feeding oil under pressure to the respective portions of the engine, and has its exhaust port connected to a not shown main oil gallery via a main oil supply passage 34. Meanwhile, the second oil pump 32 is used as the hydraulic pressure source for operating the twin clutch 26, and has its exhaust port connected to an oil supply passage 35 to the twin clutch 26. A strainer 37 extends downwardly from the respective oil pumps 31 and 32 so as to be immersed in the engine oil filled in an oil pan 36 under the crank case 14. A water pump 38 is disposed at the lower right side of the crank case 14, which has a drive shaft coaxial with the respective oil pumps 31 and 32.

Figure 5:
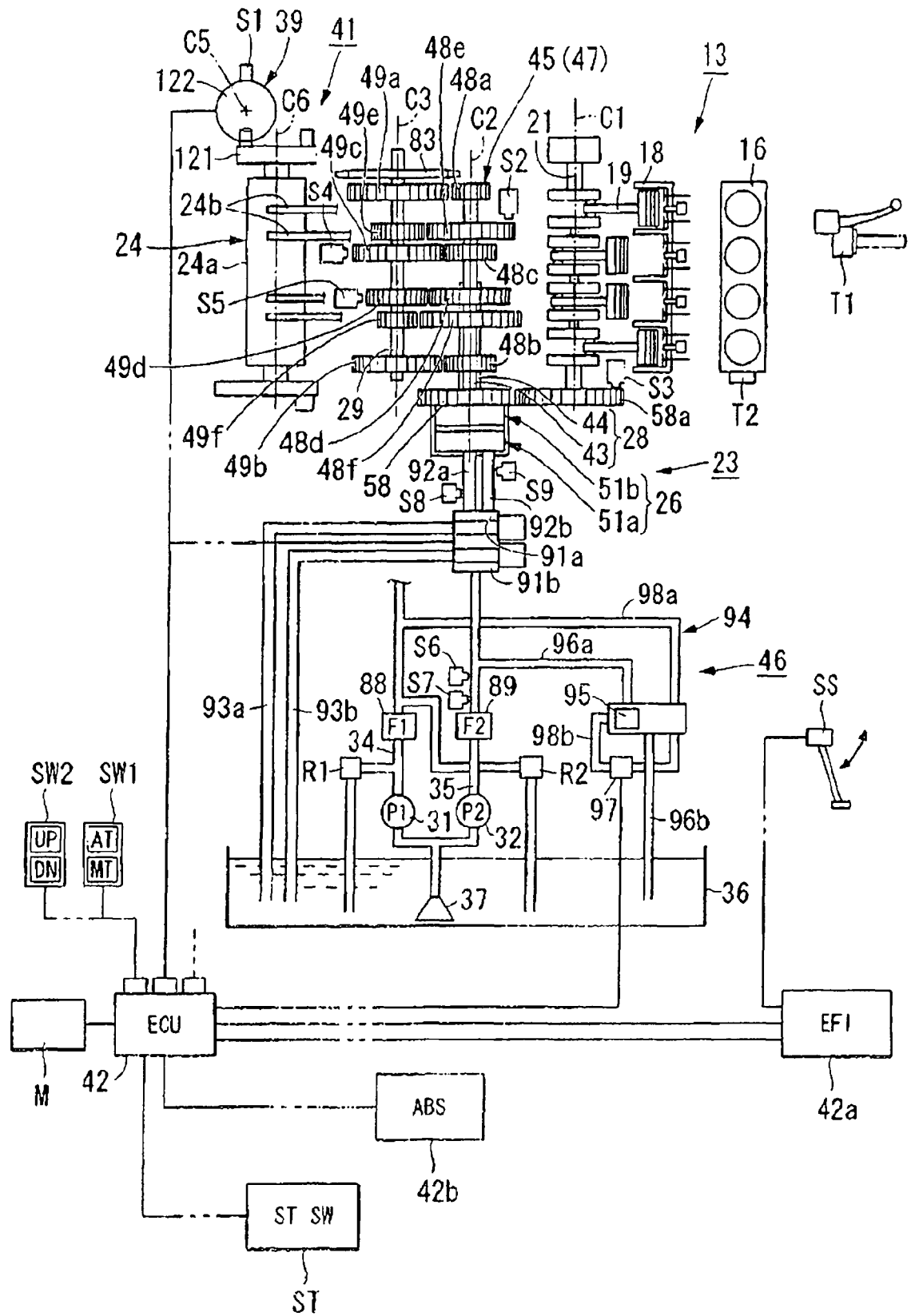
FIG. 5 is a view showing the structure of the twin clutch type transmission.

As shown in FIG. 5, the motorcycle 1 includes an automatic transmission system which is mainly formed of the twin clutch type transmission 23 connected to the engine 13, a gear shift unit 41 having a drive mechanism 39 attached to the change mechanism 24, and an electronic control unit (ECU) 42 for controlling operations of the twin clutch type transmission 23 and the gear shift unit 41.

Figure 4:
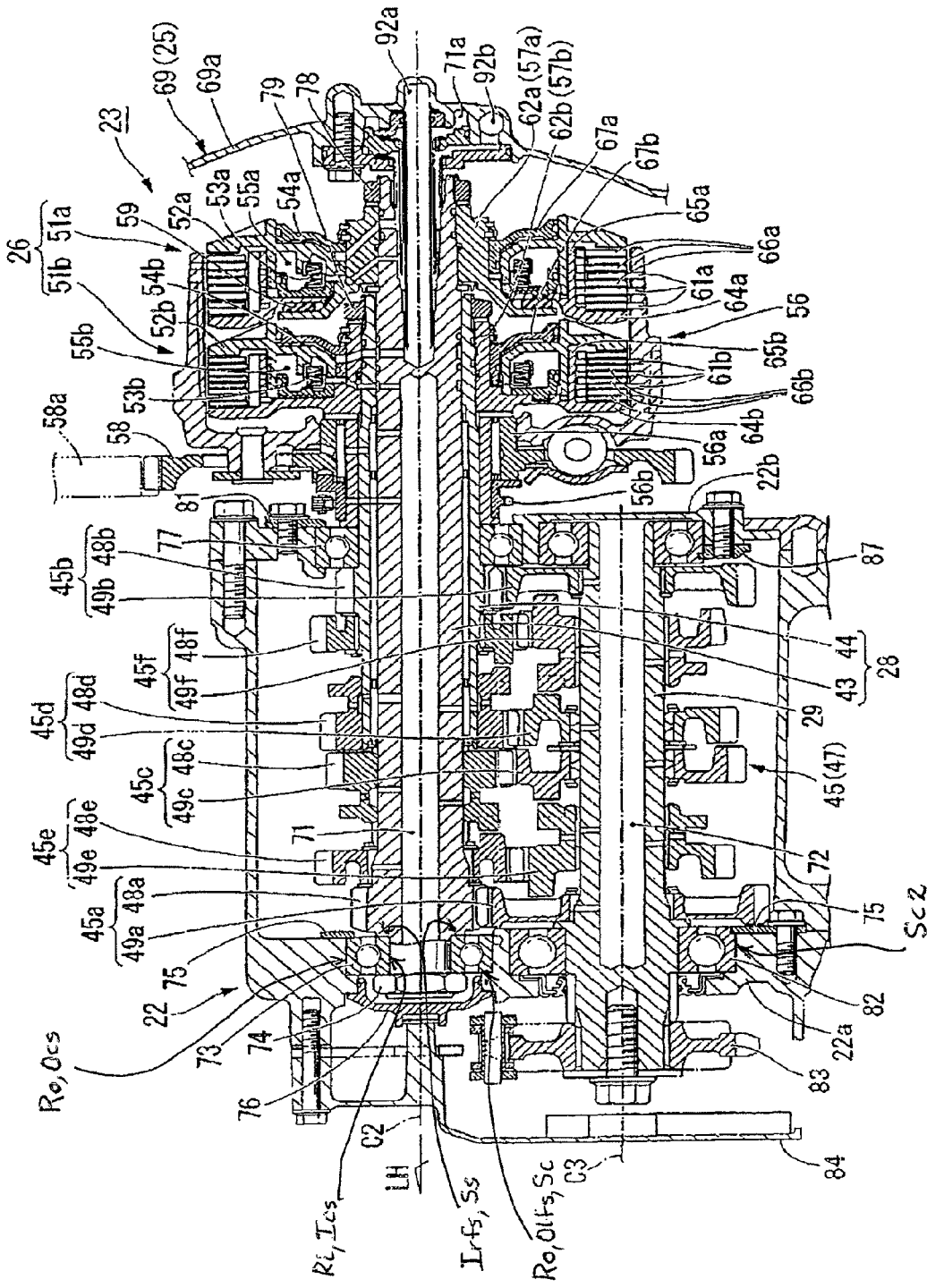
FIG. 4 is a sectional view of a twin clutch type transmission for the engine.

Referring to FIG. 4, the twin clutch type transmission 23 includes the main shaft 28 with a dual structure formed of inner and outer shafts 43 and 44, the counter shaft 29 disposed in parallel with the main shaft 28, a transmission gear group 45 disposed over the main shaft 28 and the counter shaft 29, the twin clutch 26 coaxially disposed to the right end portion of the main shaft 28, and an oil pressure feed unit 46 for feeding the hydraulic pressure to the twin clutch 26 so as to be operated. The assembly formed of the main shaft 28, the counter shaft 29 and the transmission gear group 45 will be referred to as a transmission 47 hereinafter.

The main shaft 28 has a structure in which the right side of the inner shaft 43 across the width of the transmission case 22 is inserted in the outer shaft 44. Drive gears 48a to 48f corresponding to the six-speeds of the transmission gear group 45 are arranged on the outer circumference of the inner and the outer shafts 43 and 44. Meanwhile, driven gears 49a to 49f corresponding to the six-speeds of the transmission gear group 45 are arranged on the outer circumference of the counter shaft 29. The drive gears 48a to 48f and the driven gears 49a to 49f are in mesh with each other, which form shift gear pairs 45a to 45f each corresponding to the shift speed. The reduction ratios of the respective shift gear pairs 45a to 45f will decrease in the order from the first speed to the sixth speed (high speed gear).

The twin clutch 26 includes the first and the second hydraulic disk clutches 51a and 51b which are coaxially disposed to be adjacent with each other (hereinafter simply referred to as the clutch). The inner and the outer shafts 43 and 44 are coaxially connected to the respective clutches 51a and 51b. The connection of each of the clutches 51a and 51b may be individually switched by continuing or discontinuing the supply of the hydraulic pressure from the hydraulic pressure feed unit 46.

The change mechanism 24 moves a plurality of shift forks 24b through rotation of a shift drum 24a disposed in parallel with the respective shafts 28 and 29 so as to switch the shift gear pair for transmitting power to the counter shaft 29. The drive mechanism 39 is disposed at the left end portion of the shift drum 24a. The code S1 shown in FIG. 5 represents a sensor (a pair of switch cams 131 and a first switch 133 or a second switch 134 for detecting a rotation angle of a barrel cam 122 to be described later) which detects an operation amount of the drive mechanism 39 for detecting a shift speed of the transmission 47.

Based on data of the information from an opening sensor T1 of the throttle grip, an opening sensor T2 of a throttle valve for the throttle body 16, a storage sensor SS of a side stand (or center stand), a mode switch SW1 and a shift switch SW2 installed in a handlebar in addition to various sensors as described above, the electric control unit (ECU) 42 controls operations of the twin clutch type transmission 23 and the gear shift unit 41 to change the shift speed (shift position) of the transmission 47.

The shift mode is selected by operating the mode switch SW1 between a full automatic mode where the shift speed is automatically switched based on the vehicle operation information, for example, the vehicle speed, the engine speed and the like and a semi automatic mode where the shift speed is switchable only by operating the shift switch SW2 based on the intension of the driver. The currently selected shift mode and the shift speed may be displayed on a meter unit M provided around the handlebar, for example. The ECU 42 shares data of information sent from various sensors with an ECU 42a for the fuel injector and an EUC 42b for the anti-lock braking system appropriately.

One of the clutches 51a and 51b is connected while disconnecting the other for power transmission with a shift gear pair, and the shift gear pair connected to one of the inner and outer shafts 43 and 44 is used for power transmission. The shift gear pair to be connected with the other shaft is preliminarily selected as being subsequently used among the rest of the shift gear pairs. Then one of the clutches 51a and 51b is disconnected while connecting the other to switch the power transmission to the one using the preliminarily selected shift gear pair to allow the transmission 47 to perform upshifting or downshifting. The code S2 in FIG. 5 denotes a vehicle speed sensor which detects a rotation speed of a main shaft 28 for detecting the vehicle speed (detecting the number of revolution of the drive gear 48e meshed with the driven gear 49e integrally rotatable with the counter shaft 29). The code S3 in FIG. 5 denotes a rotation number sensor which detects the number of rotation of a primary drive 58a for detecting an engine speed (rotation number of the crankshaft). The codes S4 and S5 denote rotation number sensors which detect rotation numbers of the inner and the outer shafts 43 and 44 (detecting the rotation numbers of the driven gears 49c, 49d meshed with the drive gears 48c, 48d integrally rotatable with the inner and the outer shafts 43, 44), respectively.

Figure 6:
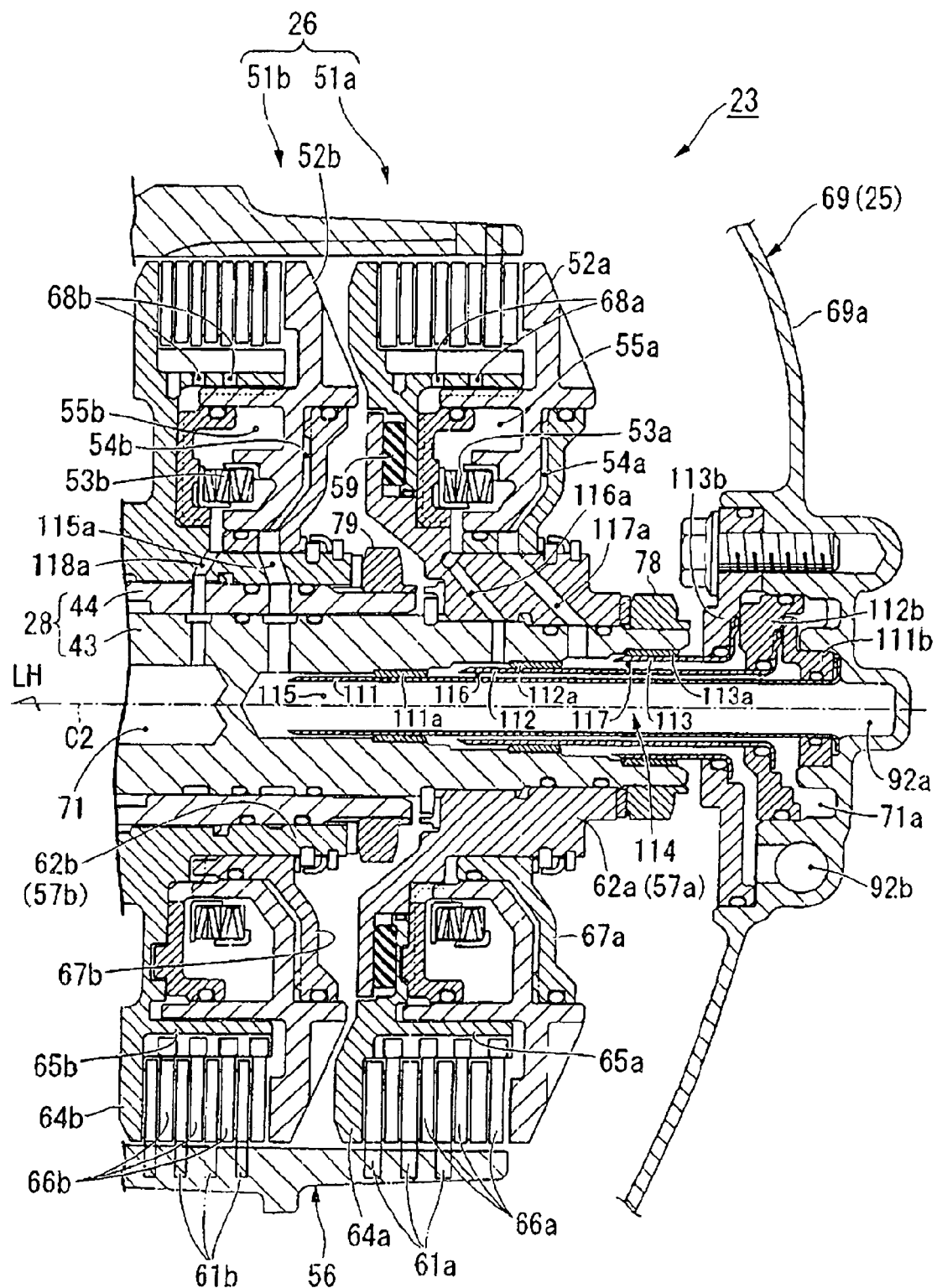
FIG. 6 is a sectional view of a twin clutch of the twin clutch type transmission.

Referring to FIG. 6, the twin clutch 26 includes a first clutch 51a for the gear with the odd number at the right side (outer side in the width direction) and a second clutch 51b for the gear with the even number at the left side (inner side in the width direction) in a clutch case 25 (in the oil pressure chamber). The clutches 51a and 51b form a wet multiple disc clutch including a plurality of clutch plates each layered alternately in the axial direction. The right side of the clutch case 25 forms a clutch cover 69 detachably fixed with a plurality of bolts (see FIGS. 3 and 4). The first clutch 51a is disposed close to a right outer wall 69a of the clutch cover 69.

The clutches 51a, 51b each of hydraulic type which axially displace pressure plates 52a, 52b under the externally supplied hydraulic pressure are provided with return springs 53a, 53b which urge the pressure plates 52a, 52b against the clutch disengagement side, oil pressure chambers 54a, 54b at engagement side for applying the pressing force directed to the clutch engagement side to the pressure plates 52a, 52b, and oil pressure chambers 55a, 55b at disengagement side for applying the pressing force directed to the clutch disengagement side to the pressure plates 52a, 52b to compensate the pressure caused by the return operation (to cancel the increase in the pressing force resulting from the centrifugal force of the clutches 51a, 51b). The relatively low oil pressure from a first oil pump 31 constantly acts on the oil pressure chambers 55a, 55b at the disengagement side. Meanwhile, the relatively high oil pressure may be applied to the oil pressure chambers 54a, 54b at the engagement side from the oil pressure supply unit 46.

Referring to FIG. 4, the clutches 51a, 51b are structured to have substantially the same diameter and to share a single clutch outer 56. The clutch outer 56 has a cylindrical shape with a bottom and is opened rightward. A clutch center 57a for the first clutch 51a and a clutch center 57b for the second clutch 51b are disposed at the inner left and inner right sides of the clutch outer.

A primary driven gear 58 is connected to a left side of the bottom of the clutch outer 56 via a spring damper. A primary drive gear 58a of the crankshaft 21 is engaged with the primary driven gear 58. The clutch outer 56 has its hub portion 56a rotatably supported at the main shaft 28 (outer shaft 44) relative thereto via a needle bearing, and integrally rotates accompanied with rotation of the crankshaft 21. A drive sprocket 56b for driving the oil pumps 31, 32 is disposed at the left side of the primary driven gear 58 of the hub portion 56a of the clutch outer 56 so as to be integrally rotatable. A plurality of clutch plates 61a for the first clutch 51a and clutch plates 61b for the second clutch 51b are supported at the right and left inner circumferential sides of the outer wall of the clutch outer 56 so as not to be relatively rotatable, respectively.

A clutch center 57a of the first clutch 51a has its center cylindrical portion 62a spline fit with a right end portion of the inner shaft 43 which projects to the right from the right end portion of the outer shaft 44 so as to be integrally fixed with a locknut 78. The left side of the clutch center 57a forms a flange portion 64a which extends toward the inner circumference of the outer wall of the clutch outer 56. An inner wall portion 65a projects to the right at the intermediate portion in the radial direction of the flange portion 64a. A plurality of clutch disks 66a are supported on the outer circumference of the inner wall portion 65a so as not to be relatively rotatable.

The clutch disks 66a and the clutch plates 61a are alternately layered in the direction of the clutch axis.

The pressure plates 52a are disposed oppositely at a predetermined interval to the right of the flange portion 64a. The clutch plates 61a and the clutch disks 66a which are alternately layered are interposed between the outer circumference of the pressure plate 52a and the outer circumference of the flange portion 64a. The oil pressure chamber 55a at disengagement side is formed between the inner circumference of the pressure plate 52a and the inner circumference of the flange portion 64a, and includes a return spring 53a for urging the pressure plate 52a rightward (to the side separating away from the flange portion 64a, clutch disengagement side) therein.

A support flange portion 67a, integrally provided on the outer circumference of the center cylindrical portion 62a, is disposed to the right of the inner circumference of the pressure plate 52a opposite thereto. The oil pressure chamber 54a at engagement side is formed between the support flange portion 67a and the inner circumference of the pressure plate 52a.

The flange portion 64a is divided into the inner and the outer circumferential sides. A damper member 59 formed of an elastic material such as rubber is interposed between the inner and the outer peripheral sides for improving the shock-absorbing performance upon engagement/disengagement of the first clutch 51a.

Meanwhile, the clutch center 57b of the second clutch 51b has its center cylindrical portion 62b spline fit with the right end portion of the outer shaft 44, and is integrally fixed thereto with a locknut 79. The left side of the clutch center 57b forms a flange portion 64b which extends toward the inner circumference of the outer wall of the clutch outer 56. An inner wall portion 65b projects to the right at the intermediate portion in the radial direction of the flange portion 64b. A plurality of clutch disks 66b are supported on the outer circumference of the inner wall portion 65b so as not to be relatively rotatable. The clutch disks 66b and the clutch plates 61b are alternately layered in the direction of the clutch axis.

The pressure plates 52b are oppositely disposed to the right of the flange portion 64 at a predetermined interval. The clutch plates 61b and the clutch disks 66b are alternately layered and are interposed between the outer circumference of the pressure plate 52b and the outer circumference of the flange portion 64b. The oil pressure chamber 55b at the disengagement side is formed between the inner circumference of the pressure plate 52b and the inner circumference of the flange portion 64b, and includes a return spring 53b for urging the pressure plate 52b to the right (to the side separating away from the flange portion 64b, clutch disengagement side) therein.

A support flange portion 67b, integrally provided on the outer circumference of the center cylindrical portion 62b, is disposed to the right of the inner circumference of the pressure plate 52b opposite thereto. The oil pressure chamber 54b at the engagement side is formed between the support flange portion 67b and the inner circumference of the pressure plate 52b.

The flange portion 64b has the inner and outer circumference sides integrally formed. However, it may be structured to have the inner and outer circumference sides to be separate via the damper member likewise the flange portion 64a.

Each of the clutches 51a and 51b has the different thickness of the respective clutch plates 61a, 61b (the thickness of the clutch plate 61a of the first clutch 51a is larger than that of the clutch plate 61b of the second clutch 51b) so as to make the respective thermal capacity different irrespective of the same numbers of the disks and diameters.

In the case where the engine is stopped (oil pumps 31, 32 are stopped), the clutches 51a and 51b displace the pressure plates 52a, 52b to the right under the urging force of the return springs 53a, 53b into a clutch disengagement state where the friction engagement between the clutch plates 61a, 61b and the clutch disks 66a, 66b is released. In the state where the oil pressure supply from the oil pressure supply unit 46 is stopped, the urging force of the return springs 53a, 53b and the oil pressure of the respective oil pressure chambers 55a, 55b at disengagement side are applied to the pressure plates 52a, 52b into the clutch disengagement state even if the engine is operated.

Meanwhile, in the state where the engine is operated, and relatively high oil pressure is supplied from the oil pressure supply unit 46 to the oil pressure chamber 54a at engagement side, the first clutch 51a displaces the pressure plate 52a to the left (to the side of the flange portion 64a, the clutch engagement side) against the oil pressure of the oil pressure chamber 55a at disengagement side and the urging force of the return spring 53a to grip the clutch plates 61a and the clutch disks 66a so as to be friction engaged. It is brought into the clutch engagement state which allows the torque transmission between the clutch outer 56 and the clutch center 57a.

Likewise in the above-described case, in the state where the engine is operated and a relatively high oil pressure is supplied from the oil pressure supply unit 46 to the oil pressure chamber 54b at engagement side, the second clutch 51b displaces the pressure plate 52b to the left (to the side of the flange portion 64b, the clutch engagement side) against the oil pressure of the oil pressure chamber 55b at the disengagement side and the urging force of the return spring 53b to grip the clutch plates 61b and the clutch disks 66b so as to be friction engaged. It is brought into the clutch engagement state which allows the torque transmission between the clutch outer 56 and the clutch center 57b.

When the oil pressure supply to the oil pressure chambers 54a, 54b at engagement side is stopped from the clutch engagement state of the respective clutches 51a and 51b, the pressure plates 52a, 52b are displaced to the left under the oil pressure of the oil pressure chambers 55a, 55b at disengagement side and the urging force of the return springs 53a, 53b so as to release the friction engagement between the clutch plates 61a, 61b and the clutch disks 66a, 66b into the clutch disengagement state where the torque transmission between the clutch outer 56 and the clutch centers 57a, 57b is disabled. The use of the oil pressure of the oil pressure chambers 55a, 55b at the disengagement side in addition to the urging force of the return springs 53a, 53b allows the pressure plates 52a, 52b to move even if the oil pressure resides in the oil pressure chambers 54a, 54b at engagement side owing to the centrifugal force.

The engine oil supplied to the oil pressure chambers 55a, 55b at disengagement side of the clutches 51a, 51b is guided to the outside the oil pressure chamber via the oil passages 68a, 68b formed in the inner wall portions 65a, 65b so as to be supplied to the clutch plates 61a, 61b and the clutch disks 66a, 66b at the outer circumference of the inner wall portions 65a, 65b. The work oil in the oil pressure chambers 55a, 55b at the disengagement side is allowed to be released to hold a predetermined low pressure state in the oil pressure chambers 55a, 55b at disengagement side and to enhance the lubricating and cooling performance of the clutch plates 61a, 61b and the clutch disks 66a, 66b in the disengagement condition.

Figure 7A:
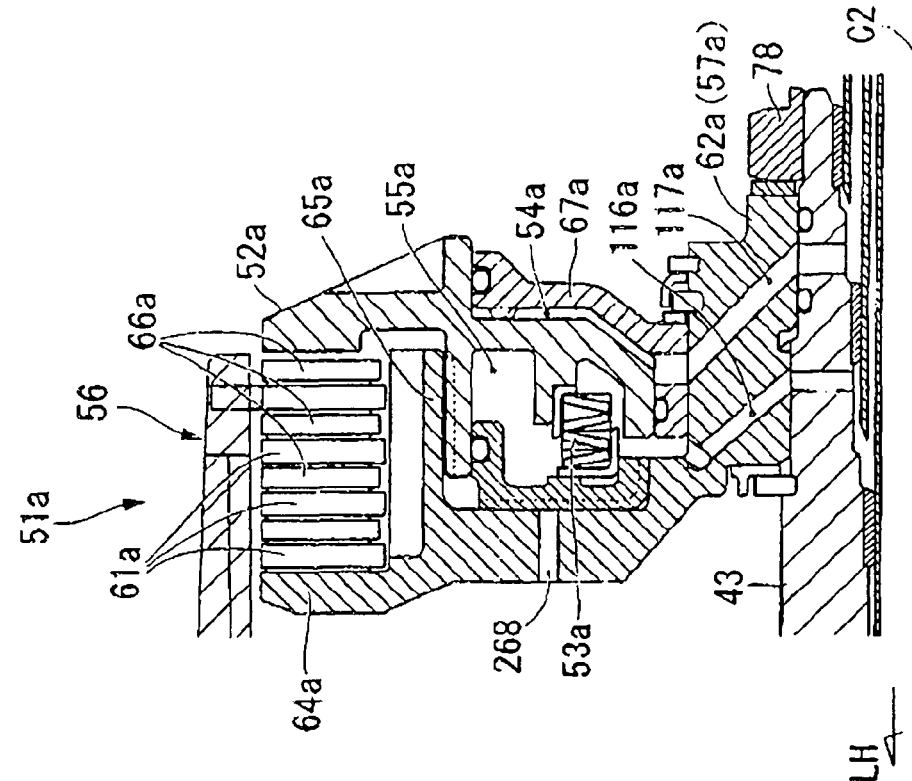
FIGS. 7(a) and 7(b) are sectional views showing a part of FIG. 6; wherein 7(a) shows a first modified example of an oil feed passage to the clutch disk of the twin clutch, and 7(b) shows a second modified example of the oil feed passage.
Figure 7B:
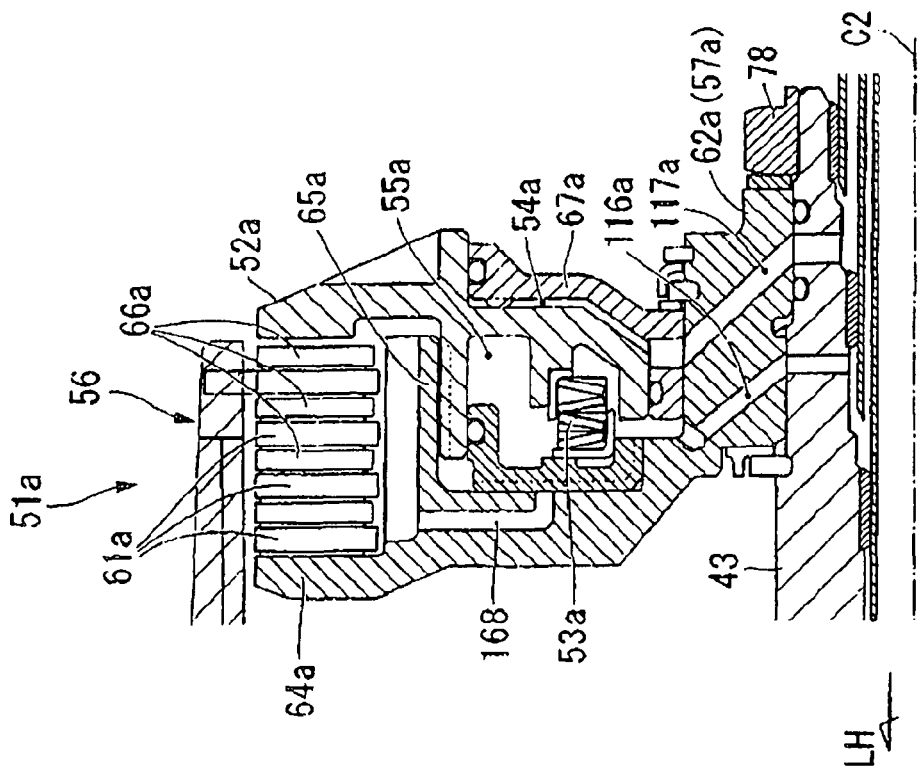

The oil passages 68a, 68b may be formed in the flange portion 64a of the clutch center 57a substantially perpendicular to the clutch axis direction likewise the oil passage 168 as shown in FIG. 7(a), for example. It may be formed in the flange portion 64a of the clutch center 57a substantially in parallel with the clutch axis direction likewise the oil passage 268 as shown in FIG. 7(b). Although the first clutch 57a is shown in FIG. 7(a), the similar modification may apply to the second clutch 51b.

Referring to FIG. 4, the transmission 47 is of constant mesh type having the drive gears 48a to 48f and driven gears 49a to 49f corresponding to the respective speeds constantly meshed. The gears may be classified into the free gear which is relatively rotatable with respect to the shaft and the slide gear which is spline fit with the shaft. The change mechanism 24 slides the arbitrary gear to allow power transmission with the shift gear pair corresponding to the shift speed.

Main supply oil passages 71, 72 each capable of supplying oil pressure from the first oil pump 31 are formed within a main shaft 28 (inner shaft 43) and the counter shaft 29, respectively. The engine oil is supplied to the shift gear group 45 via the respective main oil supply passages 71 and 72.

The inner shaft 43 of the main shaft 28 has a hollow cylindrical shape with a relatively large thickness and is relatively rotatably inserted into the outer shaft 44 which has a cylindrical shape with a relatively a small thickness via a needle bearing.

The left end portion of the inner shaft 43 reaches a left outer side wall 22a of the transmission case 22 so as to be rotatably supported via a ball bearing 73. Ball bearing 73 has an outer race Ro with an outer circumferential surface Ocs and a left facing surface Olfs disposed in a circular stepped portion Sc on the left outer side wall 22a of the transmission case 22. In addition, ball bearing 73 has an inner race Ri with an inner circumferential surface Ics, a right facing surface Irfs disposed in a circular stepped portion Sc portion Ss formed on the inner shaft 43. The projecting portion of the inner shaft 43 is screwed with a locknut 74 such that the right facing surface Irfs and the inner race Ro of the ball bearing 73 is tightened so as to be fixed by the circular stepped portion Ss formed on the inner shaft 43 and by the locknut 74 and the inner shaft 43.

Figure 8:
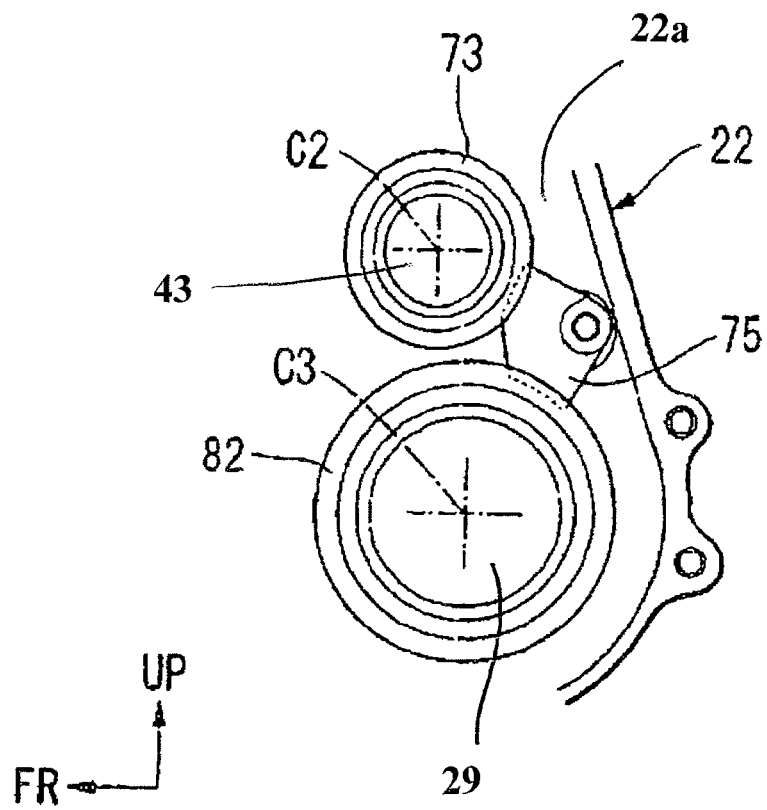
FIG. 8 is a side view of a bearing holder which holds the ball bearing for supporting the left end portion of the shaft of the twin clutch type transmission on the left side wall of the transmission case.

Referring to FIG. 8, a holder plate (holding member) 75 is fixed on an inside of the left outer side wall 22a of the transmission case 22 with a bolt B1 such that the outer race Ro of the ball bearing 73 is tightened between a right facing surface of the circular stepped portion Sc formed on the inside of the left outer side wall 22a and a left facing surface of the holding plate (holder member) 75. This allows the inner shaft 43 to be positioned in the axial direction via the ball bearing 73. The left end portion of the inner shaft 43 pierces through the left outer side wall 22a of the transmission case 22. The through hole of the inner shaft 43 in the left outer side wall 22a (support hole of the ball bearing 73) is oil tightly sealed with a seal cap 76 which is fit from the outside of the transmission case 22.

The right end portion of the inner shaft 43 pierces the right side wall (left side wall of the clutch case 25) 22b of the transmission case 22 to reach the portion around the right outer side wall 69a of the clutch case 25 (clutch cover 69). The clutch center 57a of the first clutch 51a is attached to the right end portion so as not to be relatively rotatable. The intermediate portion of the inner shaft 43 in the lateral direction is rotatably supported at the right side wall 22b of the transmission case 22 via the outer shaft 44 and the ball bearing 77. The locknut 78 is screwed with the right end portion of the inner shaft 43 such that the center cylindrical portion 62a of the clutch center 57a is tightened to be fixed by the locknut 78 and the thrust receiving portion of the inner shaft 43.

The outer shaft 44 which is shorter than the inner shaft 43 has its left end portion terminated at the lateral intermediate portion of the transmission case 22. The drive gears 48b, 48d, 48f corresponding to the shift speed with even numbers (second-, fourth-, sixth-speeds) of the shift gear group 45 are supported at the portion of the outer shaft 44 to the left of the ball bearing 77 for the fourth-speed, sixth-speed, and second-speed arranged from the left. Meanwhile, the drive gears 48a, 48c, 48e corresponding to the shift speed with odd numbers (first-, third-, fifth-speeds) of the shift gear group 45 are supported at the portion of the inner shaft 43 to the left of the left end portion of the outer shaft 44 for the first-speed, fifth-speed and third speed arranged from the left.

The right end portion of the outer shaft 44 pierces the right side wall 22b of the transmission case 22 to reach the inside the clutch case 25. The clutch center 57b of the second clutch 51b is attached to the right end portion so as not to be relatively rotatable. The clutch outer 56 (and primary driven gear 58) is relatively rotatably supported at the portion of the outer shaft 44 between clutch center 57b and the ball bearing 77.

The locknut 79 is screwed with the right end portion of the outer shaft 44 such that the inner race of the ball bearing 77, the distance collar inside the hub portion 56a of the clutch outer 56 and the center cylindrical portion 62b of the clutch center 57b are tightened to be fixed by the locknut 79 and the thrust receiving portion of the outer shaft 44.

A holder plate 81 is fixed to the right side wall 22b of the transmission case 22 from the outer side of the case (at the side of the clutch case 25) with a bolt such that the outer race of the ball bearing 77 is tightened to be fixed by the stepped portion formed by the holder plate 81 and the right side wall 22b of the transmission case 22. This allows the outer shaft 22 to be positioned with respect to the transmission case 22 of the outer shaft 44 in the axial direction via the ball bearing 77.

The left side portion of the counter shaft 29 is rotatably supported at the left outer side wall 22a of the transmission case 22 via the second ball bearing 82. The left end portion of the counter shaft 29 projects to the left of the second ball bearing 82. A drive sprocket 83 of the power transmission mechanism to the rear wheel 11 is spline fit with the left end portion so as to be fixed with the bolt. The portion around the drive sprocket 83 and the seal cap 76 is covered with a sprocket cover 84 attached to the left side of the transmission case 22. The outer race of the second ball bearing 82 is tightened between another circular stepped portion Sc2 formed on the inside of the left outer side wall 22a of the transmission case 22 and the holder plate (holding member) 75 (see FIG. 8).

The right end portion of the counter shaft 29 is rotatably supported at the right side wall 22b of the transmission case 22 via the ball bearing 86. The holder plate 87 is fixed to the right side wall 22b of the transmission case 22 with the bolt such that the outer race of the ball bearing 86 is tightened to be fixed by the stepped portion formed by the holder plate 87 and the right side wall 22b of the transmission case 22. The driven gears 49a to 49f corresponding to the respective shift speeds of the shift gear group 45 are supported at a portion between the ball bearings 82 and 86 of the counter shaft 29 in the same order as that of the drive gears 48a to 48f.

The transmission 47 is structured as the cartridge type which is detachable outside the transmission case 22 together with the right side wall 22b of the transmission case 22.

The right side wall 22b of the transmission case 22 is structured to be detachable with respect to the case body with a plurality of bolts. It functions as the transmission holder which holds the transmission 47 as a single unit.

The explanation with respect to the detachment of the transmission 47 from the transmission case 22 will be briefly described. The sprocket cover 84 and the seal cap 76 are detached at the left side of the case to remove the locknut 74 from the left end portion of the main shaft 28, and to remove the drive sprocket 83 from the left end portion of the counter shaft 29. Then the clutch cover 69 is detached at the right side of the case to remove the locknut 78 and the clutch center 57a and the like from the inner shaft 43. Thereafter, the locknut 79, the clutch center 57b, and the clutch outer 56 are detached from the outer shaft 44 to draw the transmission 47 to the right of the transmission case 22 together with the transmission holder. At this time, the ball bearing 73 which supports the left end portion of the main shaft 28 and the ball bearing 82 which supports the left end portion of the counter shaft 29 are held at the left outer side wall 22a of the transmission case 22 with the holder plate 75.

Referring to FIG. 5, the oil pressure supply unit 46 is mainly formed of the oil pumps 31, 32, the main oil supply passage 34 extending from the outlet of the first oil pump 31, a first oil filter 88 disposed in the main oil supply passage 34, the oil supply passage 35 extending from the outlet of the second oil pump 32, a second oil filter 89 disposed in the oil supply passage 35, first and second solenoid valves (proportional type linear solenoid valve) 91a, 91b to which the downstream side of the oil supply passage 35 is connected, first and second oil feed passages 92a, 92b extending from the solenoid valves 91a, 91b to the oil pressure chambers 54a, 54b at engagement side of the respective clutches 51a, 51b, and an oil pressure cut unit 94 which returns the oil pressure from the second oil pump 32 into the oil pan 36 upon start-up of the engine.

Codes S6 and S7 denote an oil pressure sensor and an oil temperature sensor provided in the main oil supply passage 34 for detecting the oil pressure and the oil temperature, respectively. Codes R1 and R2 denote relief valves provided in the main oil supply passage 34 or the branch oil passage branched from the oil supply passage 35, which are operated when the oil pressure exceeds the predetermined value. Codes S8 and S9 denote oil pressure sensors provided in the respective oil feed passages 92a and 92b, for detecting the feed oil pressure to the respective clutches 51a and 51b, respectively.

The oil supply passage 35 may be in communication with one of the oil feed passages 92a and 92b individually through the operation of the respective solenoid valves 91a and 91b. When the oil supply passage 35 is communicated with one of the oil feed passages 92a and 92b, the relatively high oil pressure from the second oil pump 32 is fed to one of the oil pressure chambers 54a, 54b at engagement side of the clutches 51a, 51b via the oil feed passages 92a, 92b.

More specifically, when electric current is not applied to the first solenoid valve 91a, the communication between the oil supply passage 35 and the first oil feed passage 92a is interrupted, and the oil pressure from the second oil pump 32 and the oil pressure in the oil pressure chamber 54a at the engagement side are returned to the oil pan 36 via the return oil passage 93a. Meanwhile, when electric current is applied to the first solenoid valve 91a, the oil supply passage 35 is in communication with the first oil feed passage 92a, and the oil pressure from the second oil pump 32 may be supplied to the oil pressure chamber 54a at the engagement side via the first oil feed passage 92a.

Likewise the above-described case, when electric current is not applied to the second solenoid valve 91b, the communication between the oil supply passage 35 and the second oil feed passage 92b is interrupted, and the oil pressure from the second oil pump 32 and the oil pressure within the oil pressure chamber 54b at the engagement side are returned to the oil pan 36 via the return oil passage 93b. When electric current is applied to the second solenoid valve 91b, the oil supply passage 35 is communicated with the second oil feed passage 92b, and the oil pressure from the second oil pump 32 may be supplied to the oil pressure chamber 54b at the engagement side via the second oil feed passage 92b.

An oil pressure relief oil passage 96a is branched from the oil supply passage 35 at the portion downstream of the second oil filter 89 so as to be connected to the oil pressure relief oil passage 96b via an oil pressure relief valve 95. An oil pressure switching oil passage 98a is branched from the main oil supply passage 34 at the portion downstream of the first oil filter 88 so as to be connected to an oil pressure switching oil passage 98b via a oil pressure switching valve 97. The oil pressure switching oil passage 98b is connected to the oil pressure relief valve 95 so as to be operated under the oil pressure from the main oil supply passage 34 by opening or closing the oil pressure switching valve 97. The oil pressure cut unit 94 is mainly formed of the aforementioned oil passages and valves.

The communication between the oil pressure relief oil passages 96a and 96b is allowed or blocked through operation of the oil pressure relief valve 95. When communication between the oil pressure relief oil passages 96a and 96b is allowed, the oil pressure from the second oil pump 32 is returned into the oil pan 36 via the oil pressure relief oil passages 96a and 96b such that the oil pressure is not supplied to the clutches 51a and 51b from the solenoid valves 91a and 91b. This may hold the communication between the clutches 51a and 51b interrupted, and the load to the second oil pump 32 is reduced.

When the communication between the oil pressure relief oil passages 96a and 96b is blocked, the oil pressure from the second oil pump 32 is not returned to the oil pan 36. The oil pressure is supplied to the respective solenoid valves 91a and 91b. The solenoid valves 91a and 91b are operated in the aforementioned state such that the oil pressure is supplied to the respective clutches 51a, 51b to be switched to the clutch engagement state.

When the motorcycle 1 starts up, and then stops, in the twin clutch type transmission 23, both the clutches 51a and 51b are kept disengaged by the function of the oil pressure cut unit 94. The state of the transmission 47 is then switched from the neutral state where the power transmission is blocked for allowing the motorcycle 1 to take off to one-speed state which enables the power transmission via one-speed gear (takeoff gear, pair of shift gears 45a) upon retraction of the side stand (in the full-auto mode) or operation of the shift switch (in the semi-auto mode). As the engine speed increases from the aforementioned state, the first clutch 51a is brought into the engagement via the partial clutch engagement to allow the motorcycle 1 to take off.

During operation of the motorcycle 1, the twin clutch type transmission 23 allows only one of the clutches 51a and 51b corresponding to the current shift position to be engaged, and keeps the other disengaged so as to perform the power transmission via one of the inner and outer shafts 43 and 44, and one of the shift gear pairs 45a to 45f (both clutches may be brought into engagement, and the transmission is kept neutral for the stand-by state). The ECU 42 controls operations of the twin clutch type transmission 23 based on the information data with respect to the vehicle to preliminarily prepare the state to enable the power transmission via the shift gear pair corresponding to the next shift position.

More specifically, if the current shift position is set to the odd shift speed (or even shift speed), the next shift position becomes the even shift speed (odd shift speed). Then the engine output is transmitted to the inner shaft 43 (or outer shaft 44) via the first clutch 51*a* (or second clutch 51*b*) in the engagement state. At this time, the second clutch 51*b* (or the first clutch 51*a*) is in the disengagement state, and accordingly, the engine output is not transmitted to the outer shaft 44 (or inner shaft 43). (Alternatively, as the transmission is in the neutral state, the engine output is not transmitted even if both clutches are in the engagement states.)

When the ECU 42 determines that the shift timing is reached, the first clutch 51*a* (or the second clutch 51*b*) is brought into the disengagement state, and the second clutch 51*b* (or the first clutch 51*a*) is brought into the engagement state such that the power transmission is switched to the one using the shift gear pair corresponding to the preliminarily selected next shift position. This makes it possible to realize quick and smooth gear shifting without causing the time lag or interruption in the middle of the power transmission upon the gear shifting (in the neutral stand-by state, the next shift position is set to engage the corresponding clutch is engaged.)

As shown in FIGS. 2 and 3, a body 101 of the oil pressure cut unit 94 of the oil pressure supply unit 46 is attached to the lower right side of the crank case 14 below the clutch cover 69. A valve storage portion 102 of the oil pressure relief valve 95 and a valve storage portion 103 of the oil pressure switching valve 97 are formed in the body 101, each extending in substantially the longitudinal direction. The essential portions of the oil pressure relief passages 96*a* and 96*b* and the oil pressure switching passages 98*a* and 98*b* are formed, respectively.

The oil pressure cut unit 94 is disposed at the lower right side of the crank case 14 of the engine 13 below the clutch cover 69. The oil pressure cut unit 94 is inconspicuously disposed to keep the appearance of the engine 13 in good state. As the oil pressure cut unit 94 is prevented from projecting laterally, the cover structure may be simplified and the bank angle of the motorcycle 1 is secured. The line GL shown in FIG. 3 represents the ground line when the vehicle body banks just before the exhaust pipe 17 extending longitudinally below the engine 13 makes a landing. As the body 101 of the oil pressure cut unit 94 moves away from the ground line, protection of the oil pressure cut unit 94 may be enhanced.

Figure 9:
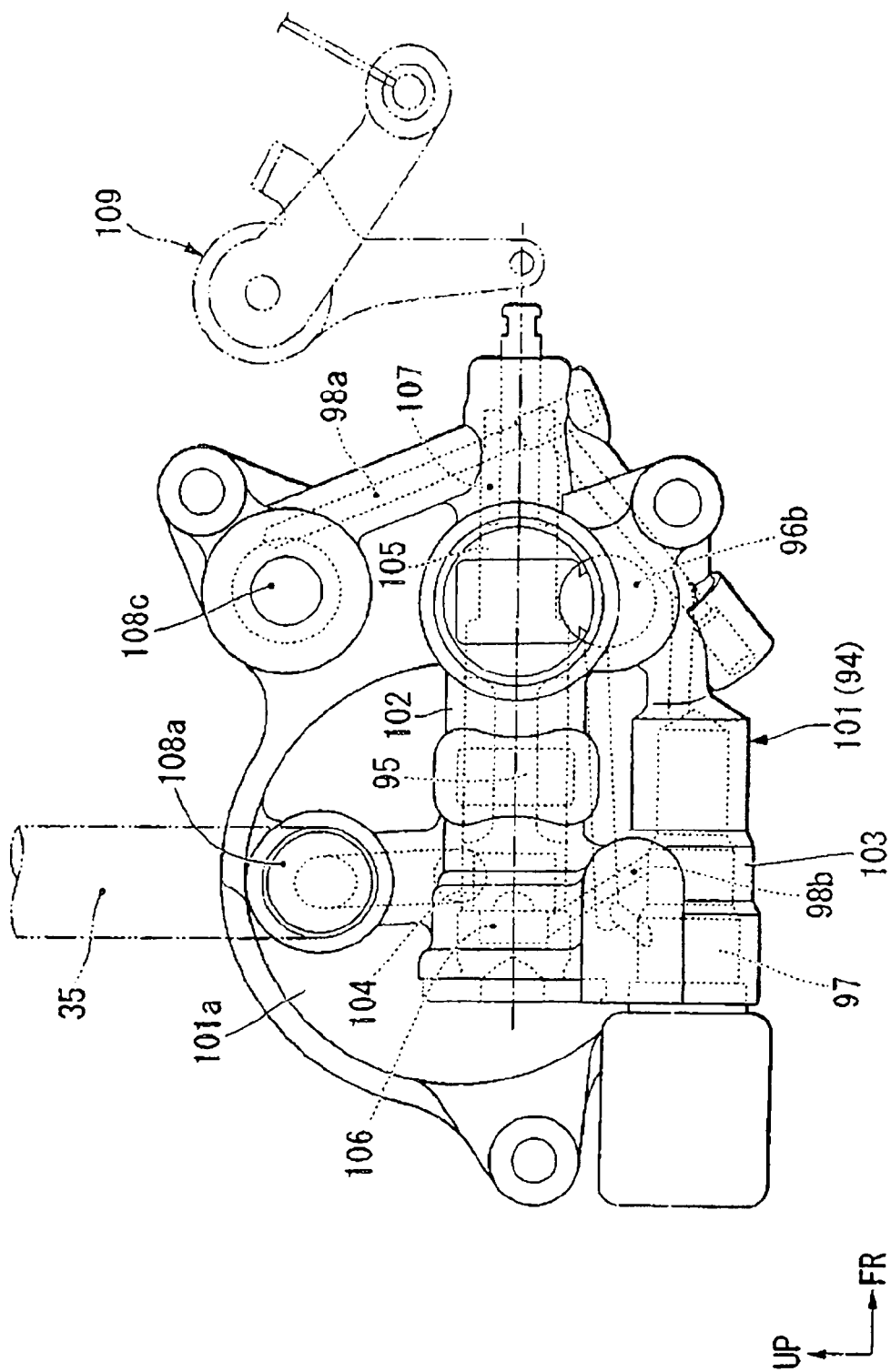
FIG. 9 is a right side view of an oil pressure cut unit of the twin clutch type transmission.

Referring to FIG. 9, the oil pressure relief valve 95 includes first and second pistons 104, 105 at the front and rear of the bar-like body, which are reciprocably fit into the front and rear of a valve storage portion 102. An oil pressure chamber 106 at relief side and an oil pressure chamber 107 at return side are formed to the front of the first piston 104 and to the rear of the second piston 105 in the valve storage portion 102.

Referring further to FIG. 3, the second oil filter 89, which is cylindrical along the left-to-right direction, is disposed at the inner side in the vehicle width direction to the rear of the body 101 in the oil pressure cut unit 94. A cover 101*a* for covering the storage portion for the second oil filter 89 in the crank case 14 is formed integrally with the rear portion of the body 101 of the oil pressure cut unit 94.

The engine oil discharged from the second oil pump 32 is filtered as it passes through the outer circumference to the center of the second oil filter 89, and further fed under pressure to the upstream of the oil supply passage 35 via the communication portion 108*a* above the cover 101*a*. The oil supply passage 35 extends upwardly from the communication portion 108*a* to reach the solenoid valves 91*a*, 91*b* disposed on the clutch case 25 (see FIGS. 2 and 3).

Solenoid valves 91*a* and 91*b* are arranged at the same side as the twin clutch 26 and the oil pressure cut unit 94, that is, at the right side of the engine so as to simplify the oil pressure supply path to reach them.

Figure 18:
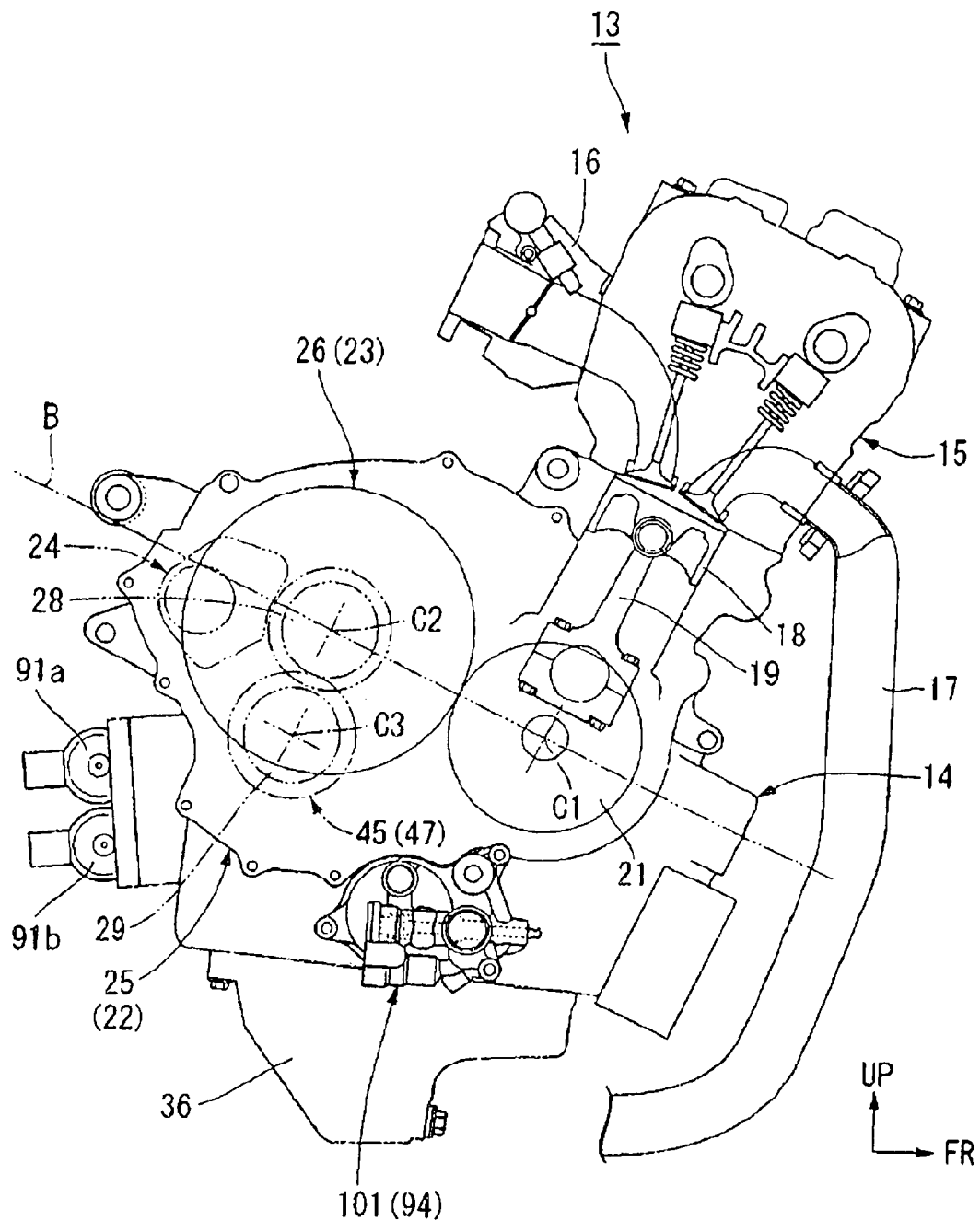
FIG. 18 is a side view corresponding to FIG. 10 showing the modified example of the arrangement of the solenoid valves in the twin clutch type transmission.

Referring to FIG. 18, the solenoid valves 91*a*, 91*b* may be disposed at the same side as the twin clutch 26 and the oil pressure cut unit 94, that is, at the right side of the engine to the rear of the clutch case 25. In this case, the oil pressure supply path may be simplified as well.

Figure 19:
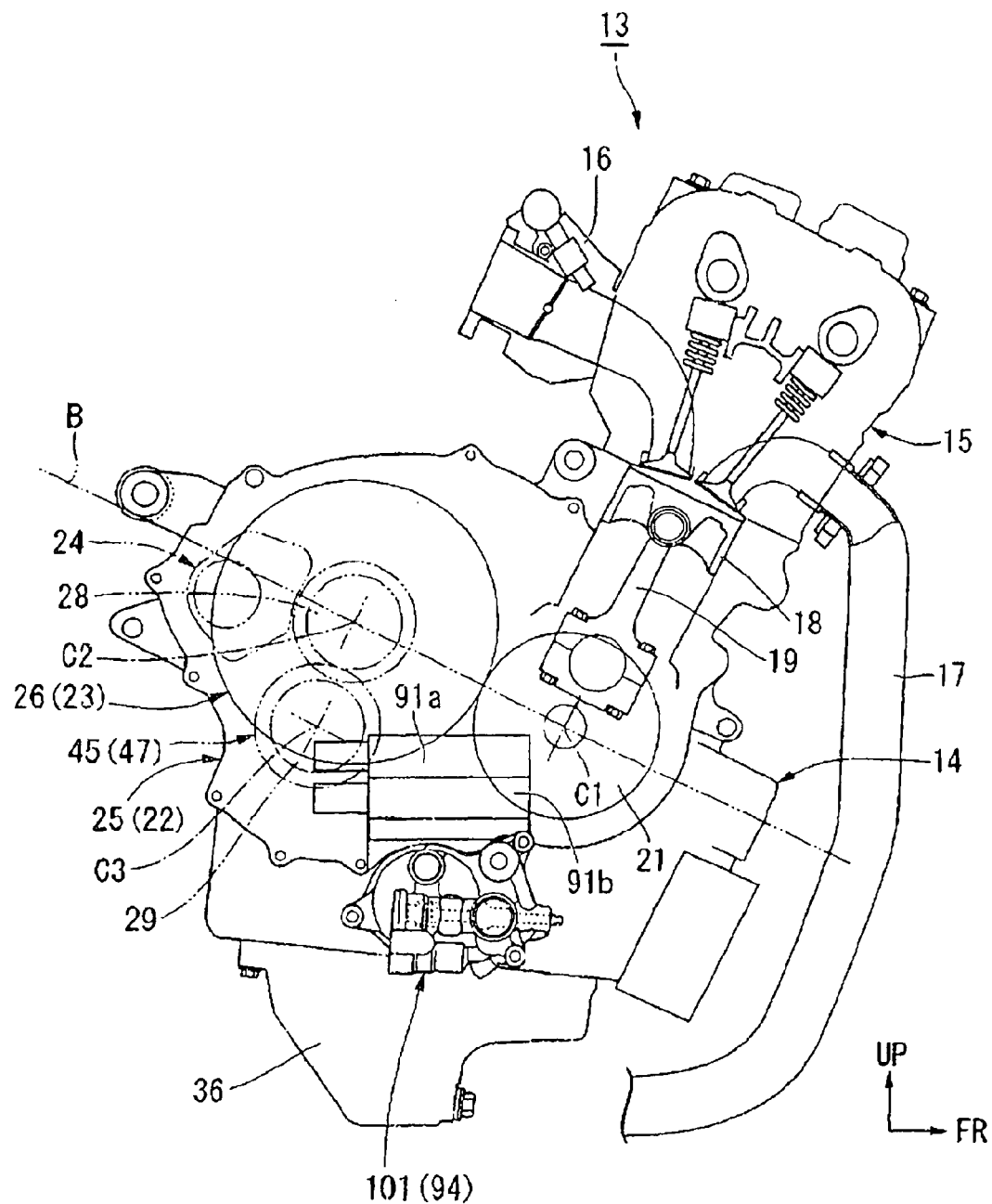
FIG. 19 is a side view corresponding to FIG. 10 showing another modified example of the arrangement of the solenoid valves in the twin clutch type transmission.
Figure 20:
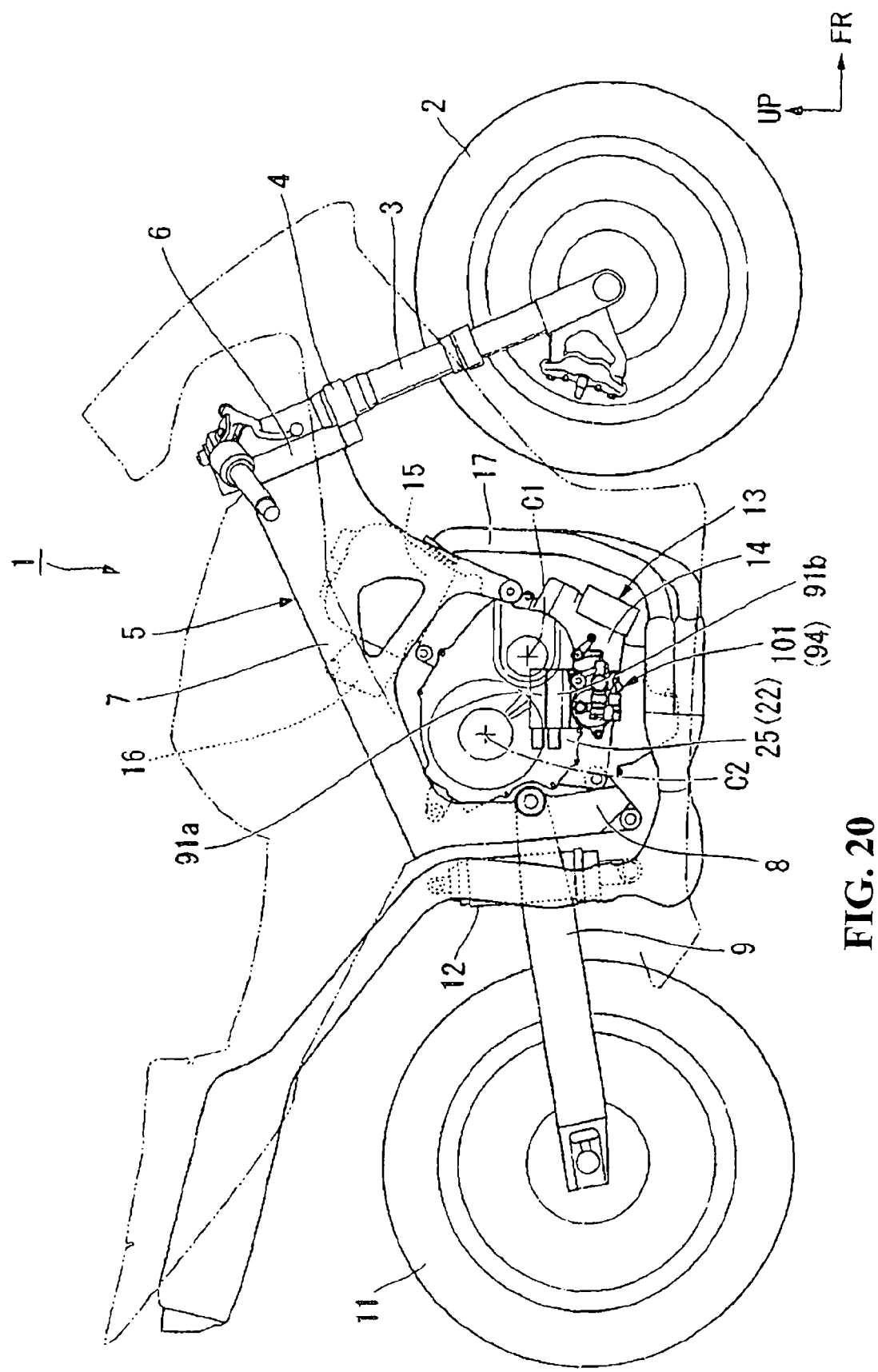
FIG. 20 is a right side view of the motorcycle having the solenoid valves arranged as shown in FIG. 19.

Referring to FIG. 19, the solenoid valves 91*a* and 91*b* may be disposed at the same side as the twin clutch 26 and the oil pressure cut unit 94 therearound so as to further simplify the oil pressure supply path. The solenoid valves 91*a*, 91*b* are provided integrally with the oil pressure cut unit 94 so as to reduce the number of parts and the man-hour for assembly. FIG. 20 shows the side view of the motorcycle where the solenoid valves 91*a*, 91*b* are disposed as shown in FIG. 19.

Referring to FIGS. 5 and 9, the oil pressure relief passage 96*a* reaches the valve storage portion 102 for the oil pressure relief valve 95 from the inside the cover 101*a*. The oil pressure relief passage 96*b* is formed to reach the oil pan 36 from the valve storage portion 102.

Meanwhile, the oil pressure switching passage 98*a* reaches the valve storage portion 103 for the switching valve 97 after passing the oil pressure chamber 107 at return side from the communication portion 108*c* with the main oil supply passage 34. The oil pressure switching oil passage 98*b* is formed to reach the oil pressure chamber 106 at relief side from the valve storage portion 103.

The oil pressure switching valve 97 is a solenoid valve of a normally open type which opens the oil pressure switching oil passages 98*a*, 98*b* in the state where electric current is not applied, and closes the oil pressure switching oil passage 98*a*, 98*b* in the state where electric current is applied.

When electric current is not applied to the oil pressure switching valve 97, the oil pressure from the first oil pump 31 is partially supplied to the oil pressure chamber 107 at return side and to the oil pressure chamber 106 at relief side through the valve storage portion 103. The forward urging force of the oil pressure applied to the oil pressure chamber 106 at relief side against the oil pressure relief valve 95 is set to be larger than the backward urging force of the oil pressure applied to the oil pressure chamber 107 at return side against the oil pressure relief valve 95. When the oil pressure is supplied to the oil pressure chamber 106 at relief side, the oil pressure relief valve 95 moves the inside of the valve storage portion 102 forward. The oil pressure relief oil passages 96*a*, 96*b* are opened at this time such that the oil pressure from the second oil pump 32 is returned to the oil pan 36.

Meanwhile, when electric current is applied to the oil pressure switching valve 97, the oil pressure switching oil passages 98*a*, 98*b* are blocked such that supply of the oil pressure from the first oil pump 31 to the oil pressure chamber 106 at relief side is stopped. The oil pressure within the oil pressure chamber 107 at return side moves the oil pressure relief valve 95 backward to block the oil pressure relief oil passages 96*a*, 96*b*. Then the oil pressure from the second oil pumps 32 may be supplied to the respective solenoid valves 91*a*, 91*b* without being returned to the oil pan 36.

Operations of the oil pressure cut unit 94 are controlled by the ECU 42 so as to open the oil pressure relief oil passages 96*a*, 96*b* to return the engine oil discharged from the second oil pump 32 to the oil pan 36 (relieve the oil pressure) upon start-up of the engine (operation of the start-up switch ST shown in FIG. 5), and to block the oil pressure relief oil passages 96*a*, 96*b* to allow supply of the feed oil pressure to the twin clutch 26 after start-up of the engine (after the engine speed becomes stable to a predetermined idling speed subsequent to the complete explosion). In the state where the side stand is pulled out, the oil pressure relief oil passage 96 may be opened so as not to take off.

As the twin clutch 26 has a large capacity to exert large load to the rotation torque required for start-up of the engine and the second oil pump 32, the clutches 51a, 51b are disengaged upon start-up of the engine (especially in the cold state), and the boosting of the second oil pump 32 is suppressed. This may suppress an increase in the friction and reduce the cranking load to improve engine start-up performance as well as a reduction in size and weight of the starter motor 27 and a not shown battery.

The structure for applying the engine oil pressure and the reaction force to each side of the oil pressure relief valve 95 may be employed instead of the structure for applying the engine oil pressure to both sides of the oil pressure relief valve 95 as described above. As chained line at the right side of FIG. 9 shows, an activation mechanism 109 may be provided for activating the oil pressure relief valve 95 using other external forces (electric actuator, manual operation and the like). In the case other than the engine start-up operation, the signal from the ECU 42 and the like may be used to execute the control for cutting the feed oil pressure to the twin clutch 26 (for example, when the side stand is pulled out, the fall of the vehicle occurs, or the engine stop switch is turned OFF).

Referring to FIG. 6, first, second third pipes 111, 112 and 113 are disposed inside the clutch cover 69 across the space between the clutch cover 69 and the right end portion of the main shaft 28 (inner shaft 43). The pipes 111, 112 and 113 are provided coaxially with the main shaft 28, which are arranged to be layered in the aforementioned order from the inner circumference each having a predetermined gap therebetween.

A right hollow portion 114 having its diameter increased to the right in approximately three stages is formed in the right side portion of the inner shaft 43. The right hollow portion 114 is separated from the main oil supply passage 71 extending from the left end opening in the inner shaft 43 to the portion around the second clutch 51b via a bulkhead. The left side portions of the pipes 111, 112 and 113 are inserted into the right hollow portion 114 from the right end opening.

The left outer circumference of the first pipe 111 is oil tightly sealed against the left inner circumference of the right hollow portion 114 via a seal member 111a. The left outer circumference of the second pipe 112 is oil tightly sealed against the intermediate portion of the inner circumference of the right hollow portion 114 via a seal member 112a. The left outer circumference of the third pipe 113 is oil tightly sealed against the right inner circumference of the right hollow portion 114 via a seal member 113a.

The right end portions of the pipes 111, 112, 113 are inserted into annular holders 111b, 112b, 113b so as to be oil tightly held therein. A flange is formed at the right end portion of each of the pipes 111, 112, 113. The right end portion of the first pipe 111 is supported in the state where the flange is gripped between the holder 111b and the right outer side wall 69a of the clutch cover 69. The right end portion of the second pipe 112 is supported in the state where the flange is gripped between the holders 111b and 112b. The right end portion of the third pipe 113 is supported in the state where the flange is gripped between the holders 112b and 113b. The holder 113b which pierces the third pipe 113 is fixed to the right outer side wall 69a of the clutch cover 69 from the inside of the case with the bolt. The holders 111b, 112b, 113b and the pipes 111, 112, 113 are fixed to the clutch cover 69.

The inner space of the first pipe 111, and each annular space defined among the pipes 111, 112, and 113 form a plurality of in-shaft oil passages 115, 116, 117 which are coaxially layered in the main shaft 28.

More specifically, the inner space of the first pipe 111 functions as the first in-shaft oil passage 115 having the right end portion in communication with the first oil feed passage 92a connected to the clutch center position of the clutch cover 69, and the left end portion in communication with the oil pressure chamber 54b at engagement side of the second clutch 51b via the oil passage 115a at engagement side which pierces the inner and outer shafts 43, 44 and the clutch center 57b in substantially radial direction of the clutch.

The space between the first pipe 111 and the second pipe 112 functions as a second in-shaft oil passage 116 having the right end portion in communication with the in-cover main oil supply passage 71a formed in the clutch cover 69, and the left end portion communicated with the oil pressure chamber 55a at disengagement side of the first clutch 51a via the oil passage 116a the disengagement side which pierces the inner shaft 43 and the clutch center 57a in substantially the radial direction of the clutch. The oil pressure from the first oil pump 31 is supplied to the in-cover main oil supply passage 71a.

The space between the second pipe 112 and the third pipe 113 functions as the third in-shaft oil passage 117 having the right end portion communicated with the second oil feed passage 92b connected to the position offset from the clutch center of the clutch cover 69, and the left end portion in communication with the oil pressure chamber 54a at the engagement side of the first clutch 51a via the oil passage 117a at engagement side which pierces the inner shaft 43 and the clutch center 57a in substantially the radial direction of the clutch.

The main oil supply passage 71 within the inner shaft 43 has the right end portion communicated with the oil pressure chamber 55b at the disengagement side of the second clutch 51b via an oil passage 118a at the disengagement side which pierces the inner and outer shafts 43, 44 and the clutch center 57b in substantially the radial direction of the clutch.

In the in-shaft oil passages 115, 116, 117 of the right side of the inner shaft 43, the capacity (section area) of the second in-shaft oil passage 116 to which the relatively low oil pressure is applied is set to be smaller than those of the other in-shaft oil passages 115 and 117 to which relatively high oil pressure is applied. Likewise the aforementioned case, each capacity of the oil passages 116a, 118a at the disengagement side is set to be smaller than that of each of the oil passages 115a, 117a at engagement side.

Figure 10:
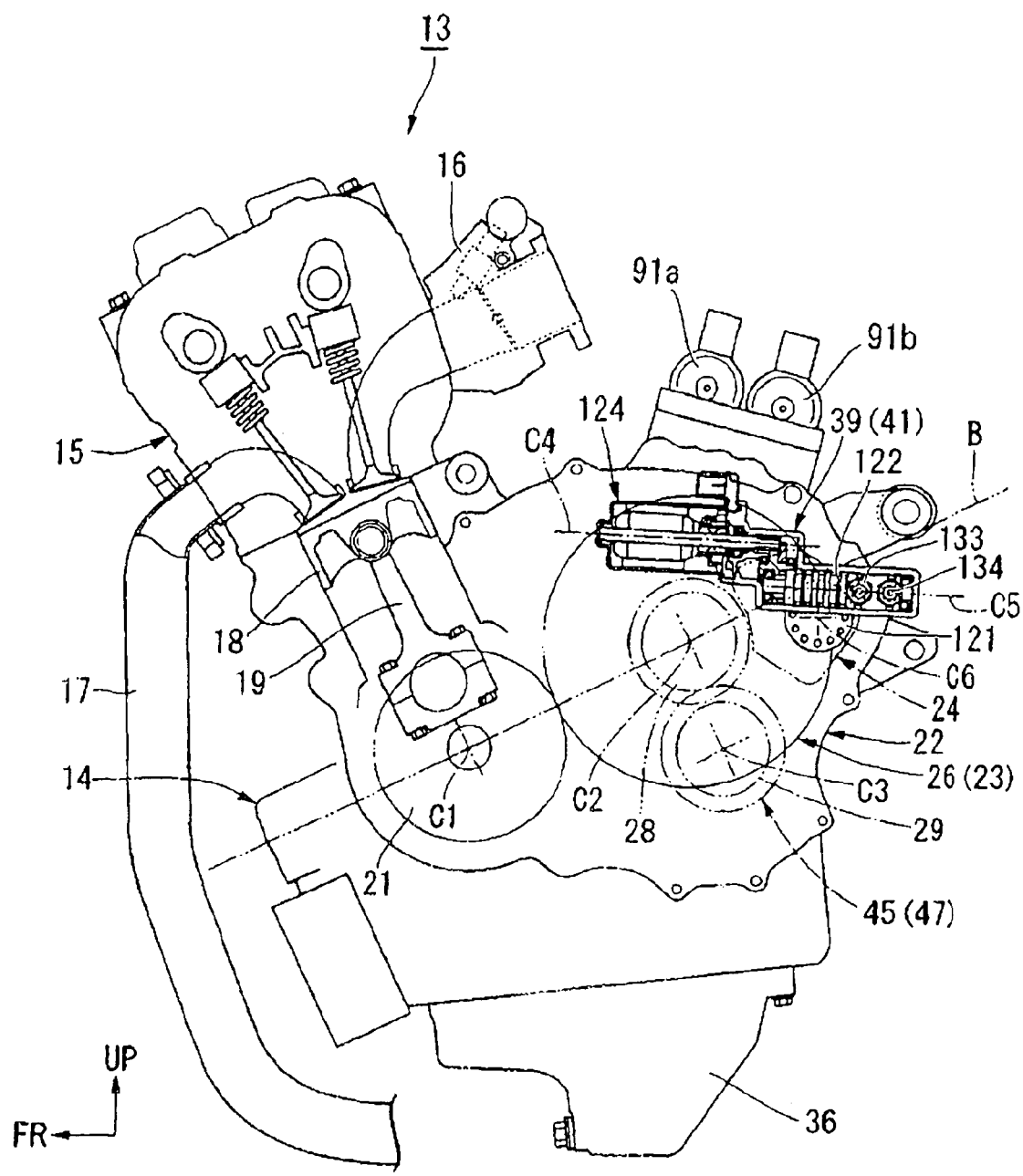
FIG. 10 is a left side view of the engine.

Referring to FIG. 10, a drive mechanism 39 for the gear shift unit 41 is disposed at the upper left portion of the transmission case 22 in the engine 13.

Figure 11A:
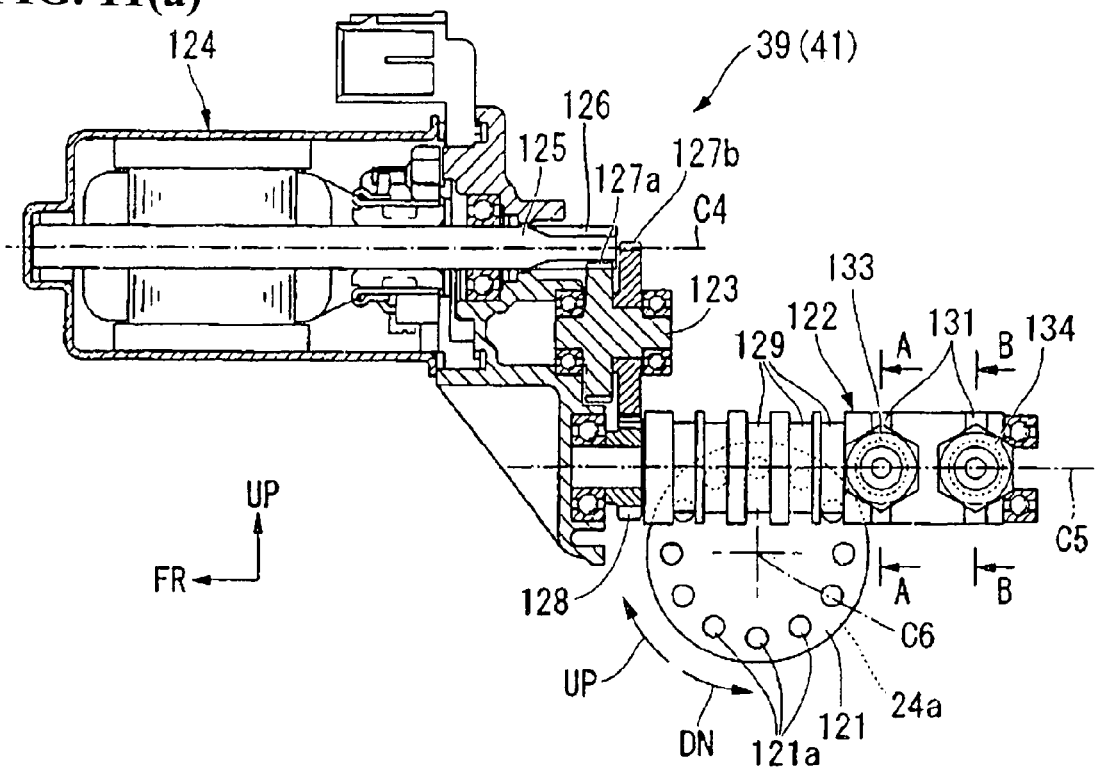
FIG. 11 is a sectional view of the gear shift unit for the engine.
Figure 11B:
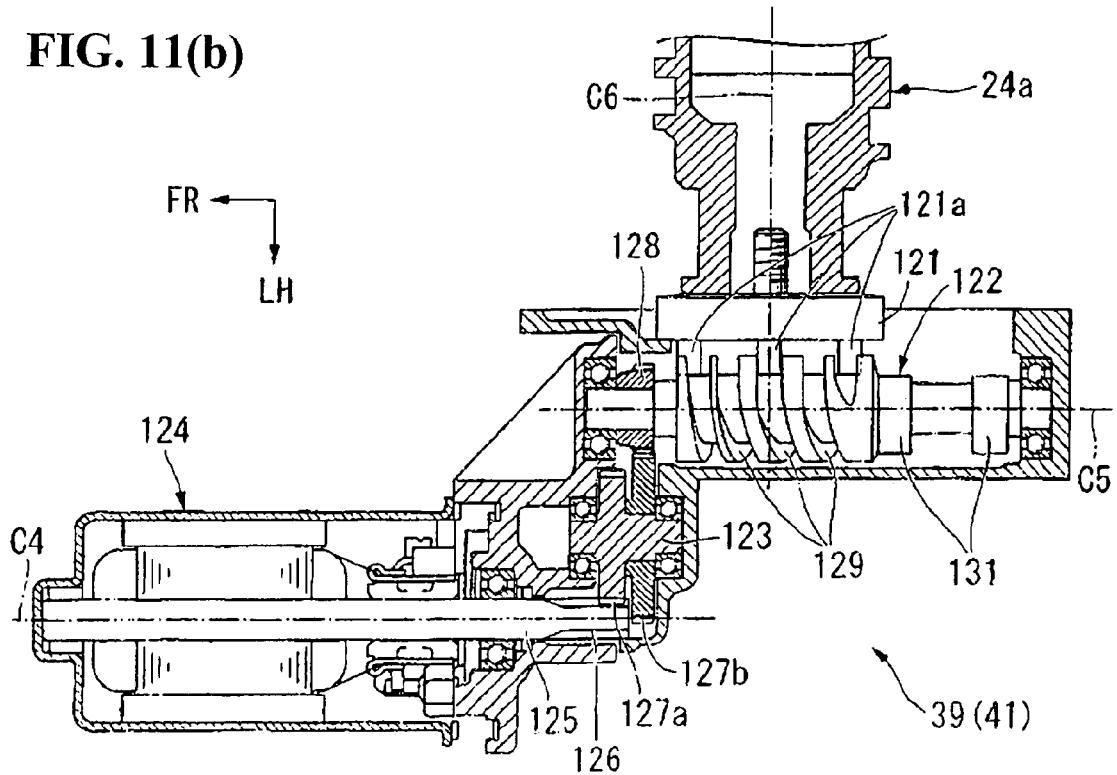

Referring to FIGS. 11(a) and 11(b), the drive mechanism 39 includes a pin gear 121 coaxially fixed to the left end portion of the shift drum 24a of the change mechanism 24, a worm-like barrel cam 122 engaged with the pin gear 121, and an electric motor 124 which applies the rotation drive force to the barrel cam 122 via a relay gear shaft 123. The shift drum 24a is driven by the electric motor 124 to be rotated to change the shift speed of the transmission 47.

The electric motor 124 is provided such that the rotation drive axis C4 extends in the longitudinal direction and a drive shaft 125 protrudes rearwardly. A drive gear 126 is formed on the outer circumference of the top end portion of the drive shaft 125 so as to be in mesh with a first relay gear 127a of the relay gear shaft 123. A second relay gear 127b of the relay gear shaft 123 is meshed with the driven gear 128 at the front end portion of the barrel cam 122. The barrel cam 122 includes the rotating axis C5 in parallel with the axis C4 of the electric motor 124, and has a plurality of cam grooves 129 formed in the outer circumference of the front end portion. The cam grooves 129 are layered to form a single thread (or a plurality of threads), with which a plurality of pins 121a, which protrude on the pin gear 121, are partially engaged.

The pin gear 121 has a disk-like body and the plurality of pins 121a arranged in parallel with the shift drum 24a at equal intervals along the circumferential direction at the left side. The rotating axis C5 of the barrel cam 122 is perpendicular to the rotating axis C6 of the pin gear 121 (shift drum 24a) along the lateral direction. The upper portion of the pin gear 121 is overlapped with the front portion of the barrel cam 122 in the side view. The pins 121a positioned at the upper portion of the pin gear 121 are engaged with the corresponding cam grooves 129 on the front outer circumference of the barrel cam 122. At least one pair of the cam groove 129 and the pin 121a may be engaged.

When the electric motor 124 is driven under the control of the ECU 42 to perform one rotation of the barrel cam 122 in the forward direction (direction of CW indicated by arrow in FIG. 12), the respective cam grooves 129 are displace rearward by the amount corresponding to one row (one pitch) in the arrangement direction (in the longitudinal direction). Then the pin gear 121 and the shift drum 24a are rotated in the upshifting direction (UP direction as indicated by arrow in FIG. 11) by the angle corresponding to the one pitch. The rotation angle of the shift drum 24a at this time corresponds to the angle which upshifts the shift speed of the transmission 47 by one shift speed.

When the electric motor 124 is driven to perform one rotation of the barrel cam 122 in the reverse direction (direction of CCW indicated by arrow in FIG. 12), the cam grooves 129 are displace rearward by the amount corresponding to one row (one pitch) in the arrangement direction (longitudinal direction) to rotate the pin gear 121 and the shift drum 24a in the downshifting direction (DN direction as indicated by arrow in FIG. 11) at the angle corresponding to one pitch. The rotation angle of the shift drum 24a at this time corresponds to the angle which downshifts the shift speed of the transmission 47 by one shift speed.

The transmission 47 enables the power transmission at the current shift position (shift position at which the power transmission is actually performed via the twin clutch 26) and at the shift position one stage upshifted or downshifted from the current shift position (shift position at which the power transmission is blocked via the twin clutch 26), that is, the shift position at the even shift speed and the odd shift speed except the neutral state.

When the upshifting by one shift speed is performed in the aforementioned transmission 47, the power transmission is enabled both at the current shift position and the shift position one stage upshifted. When the downshifting by one shift speed is performed, the power transmission is enabled both at the current shift position and the shift position one stage downshifted. The use of the shift position for the actual power transmission by the transmission 47 may be selected depending on which clutch is brought into engagement by the twin clutch 26.

Figure 13A:
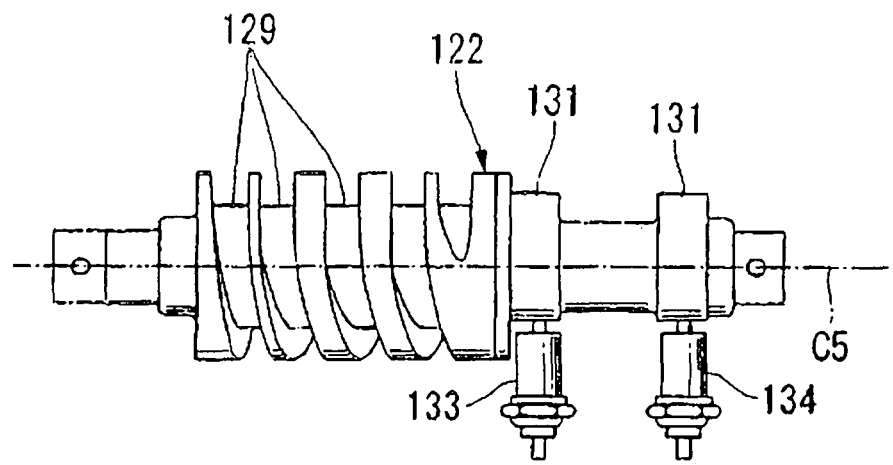
FIGS. 13(a) is a side view of a barrel cam of the gear shift unit, and 13(b) is a development view of the cam groove on the outer circumference of the barrel cam.
Figure 13B:
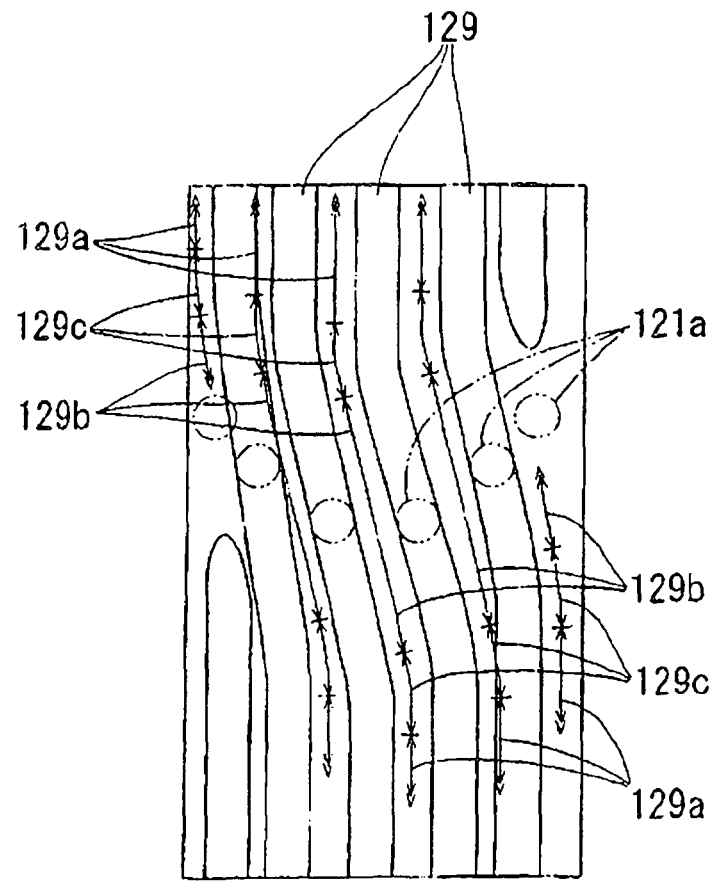

Referring to FIG. 13, each of the cam grooves 129 includes a holding range 129a which holds the position in the barrel cam axial direction (arrangement direction of the cam grooves 129) constant, and a variable range 129b where the position in the barrel cam axial direction is gently changed. In the state where the pins 121a are engaged in the holding ranges 129a of the cam grooves 129, the pin gear 121 and the shift drum 24a are not rotated even if the barrel cam 122 rotates. In the state where the pins 121a are engaged in the variable range 129b of the cam grooves 129, the pin gear 121 and the shift drum 24a rotate to the upshifting direction or the downshifting direction in accordance with the rotation of the barrel cam 122.

The holding range 129a and the variable range 129b of the cam groove 129 are smoothly connected via a curve portion 129c. The curve portion 129c of the cam groove 129 is circularly provided along the circumferential direction of the pin gear 121 (arrangement direction of the pines 121a). When the barrel cam 122 rotates the pin gear 121, the pins 121a approach from one range to the other smoothly and simultaneously. The shift drum 24a may be rotated gently and smoothly, and the load to the pins 121a and the cam grooves 129 may also be reduced.

Figure 12A:
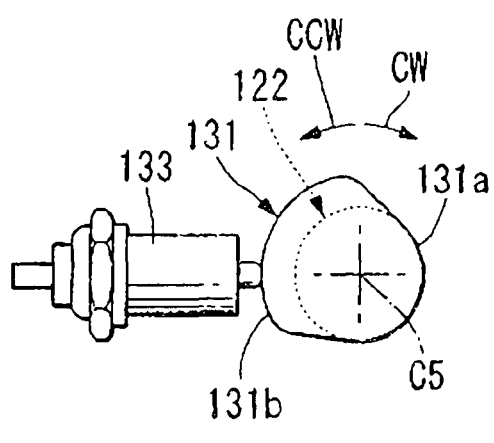
FIG. 12(a) is a sectional view taken along line A-A of FIGS. 11, and 12(b) is a sectional view taken along line B-B of FIG. 11.
Figure 12B:
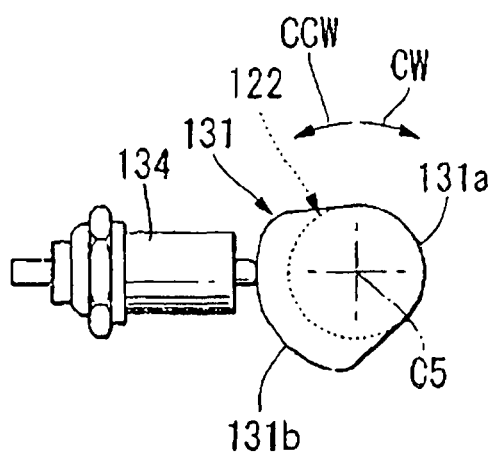

Referring to FIGS. 11(a) and 12, two front and rear switch cams 131 are provided on the outer circumference to the rear of the barrel cam 122. The first or the second switch 133, 134 is provided to the left of the switch cam 131, for example to allow the cam surface and the switch piece to face with each other. The switch cams 131, and the switches 133, 134 form the sensor S1 for detecting the rotating position of the barrel cam 122.

Each of the switch cams 131 has substantially the same shape when seen from the barrel cam axial direction, and has a cam surface formed on the outer circumference. The cam surface of the switch cam 131 includes a reference surface 131a which has a cylindrical shape coaxial with the barrel cam 122, and a cylindrical lift surface 131b having a diameter larger than that of the reference surface 131a, which are smoothly connected. The switch cams 131 are disposed such that each range for forming the lift surface has a predetermined phase difference thereamong in the barrel cam rotation direction. More specifically, the switch cam 131 for the second switch 134 is disposed by shifting the phase at a predetermined angle toward the CCW direction with respect to the switch cam 131 for the first switch 133.

In the cases where the switch pieces of the switches 133, 134 face the reference surfaces 131a of the switch cams 131 (switches 133, 134 are turned OFF), and where the switch pieces face the lift surfaces 131b of the switch cams 131 (switches 133, 134 are turned ON), the switch pieces are moved back and forth to detect the rotating state of the barrel cam 122. The switches 133, 134 are disposed so as to have the same phase in the barrel cam rotation direction.

Figures 14, 15A, 15B:
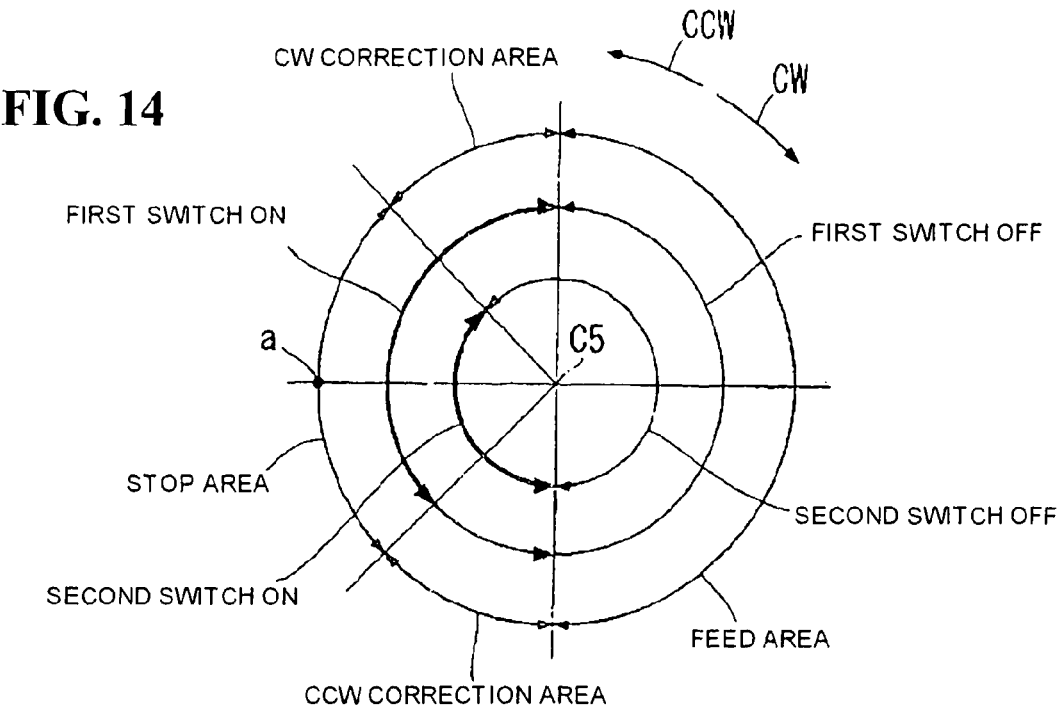
FIG. 14 is a diagram showing ON/OFF state of the first and the second switches with respect to the rotation angle of the barrel cam.
FIGS. 15(a) is a table showing ON/OFF state of the switch with respect to the rotating area of the barrel cam, and 15(b) is a table showing the torque of the motor for driving the barrel cam with respect to the rotating area of the barrel cam.

FIG. 14 is a diagram showing each ON/OFF state of the switches 133, 134 with respect to the rotation angle of the barrel cam 122. The area where the lift surfaces 131b of the switch cams 131 face the point a which represents the position for detecting the switches 133, 134 (where the switches 133, 134 are turned ON) is set as a stop area where the pins 121a of the pin gear 121 are within the holding range 129a of the cam grooves 129 of the barrel cam 122, and the drive torque of the electric motor 124 becomes 0 (see FIG. 15).

When the transmission 47 is set to complete the shifting operation, the rotation of the shift drum 24a is regulated so as to be held at a predetermined shift position without influencing the shift position even if the rotating position of the barrel cam 122 slightly displaces and the drive torque for the electric motor 124 is set to 0. The angle of the stop area is set to be equal to or larger than the value such that the barrel cam 122 rotates through inertia when the drive torque of the electric motor 124 is set to 0.

Meanwhile, the area where the reference surface 131a of the switch cam 131 faces the point a (area where the switches 133, 134 are turned OFF) is set so as the feed an area where the pins 121a of the pin gear 121 are within the variable range 129b of the cam grooves 129 of the barrel cam 122, and the electric motor 124 is driven by the normal torque (maximum torque±Tmax set in the system) (see FIG. 15).

Then the transmission 47 is in the middle of the shifting operation, and the shift drum 24a rotates to the upshifting direction or the downshifting direction depending on the rotation of the barrel cam 122. The angle of the feed area corresponds to the angle for forming the variable range 129b of the cam groove 129 of the barrel cam 122.

The area where one of the lift surfaces 131b of the switch cam 131 faces the point "a" (area where one of the switches 133, 134 is turned ON) is set to CW or CCW correction area where the pins 121a of the pin gear 121 are around the end portion of the holding range 129a of the cam groove 129 of the barrel cam 122, and the electric motor 124 is driven by the small torque (minimum torque±Tmin which overcomes the friction in the system)(see FIG. 15).

More specifically, in the CCW correction area where the second switch 134 having the phase shifted in the CCW direction of the barrel cam 122 is only turned ON, the correction is performed by driving the electric motor 124 at the minimum reverse rotation torque (−Tmin) for rotating the barrel cam 122 at the low torque to the CCW direction to set the stop area. In the CW correction area where the first switch 133 having the phase shifted to the CW direction of the barrel cam 122 is only turned ON, the correction is performed by driving the electric motor 124 at the minimum forward rotation torque (+Tmin) for rotating the barrel cam 122 at the low torque to the CCW direction to set the stop area.

Figure 16:
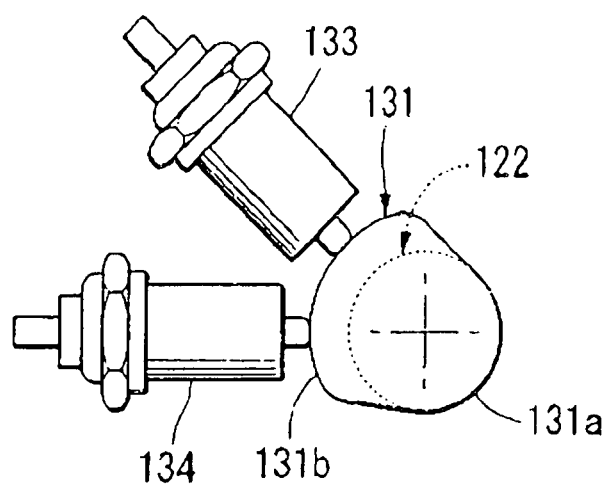
FIG. 16 is a sectional view corresponding to FIG. 12 showing the modified example of the arrangement of the first and the second sensors.

Referring to FIG. 16, the single switch cam 131 is attached to the barrel cam 122 to allow the cam surface of the switch cam 131 to face the two switches 133, 134 so as to have the phase difference in the barrel cam rotating direction. This makes it possible to reduce the number of switch cams while enabling the similar control as described above. Each of the switches 133, 134 may be electrically or magnetically structured, or structured as the non-contact type rather than formed as the mechanical contact type.

Figure 17A:
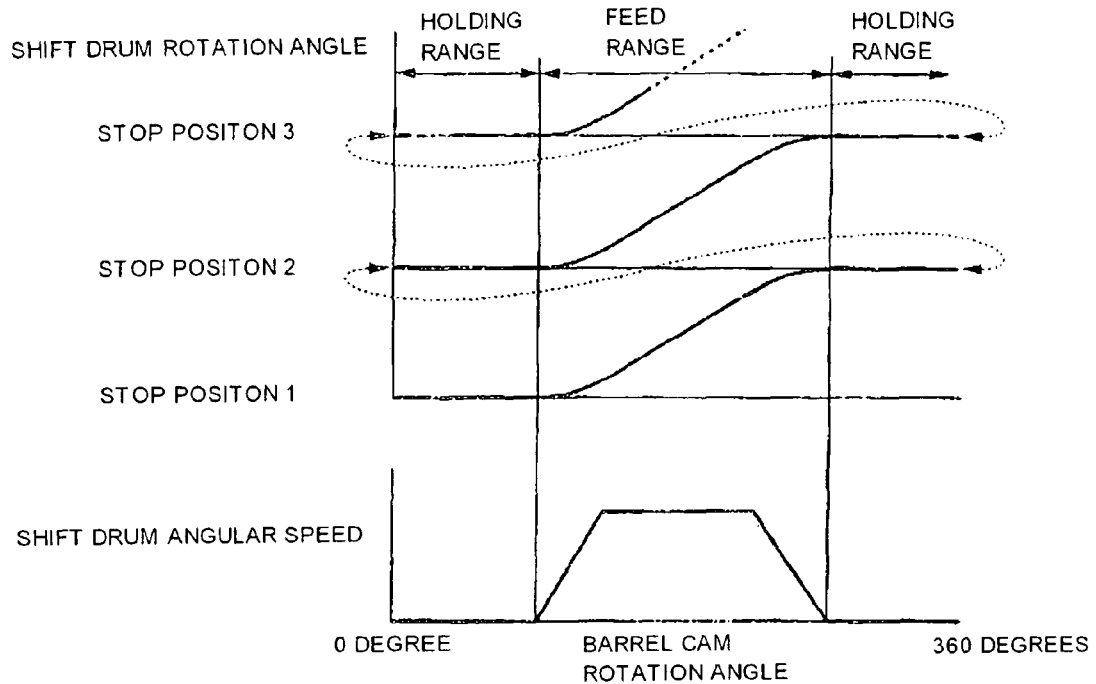
FIGS. 17(a) and 17(b) are graphs showing the rotation angle and the angular speed of the shift drum with respect to the rotation angle of the barrel cam of the gear shift unit 17(a) shows the case where the cam grooves are connected via the curve portion, and 17(b) shows the case where the cam grooves are connected with no presence of the curve portion.
Figure 17B:
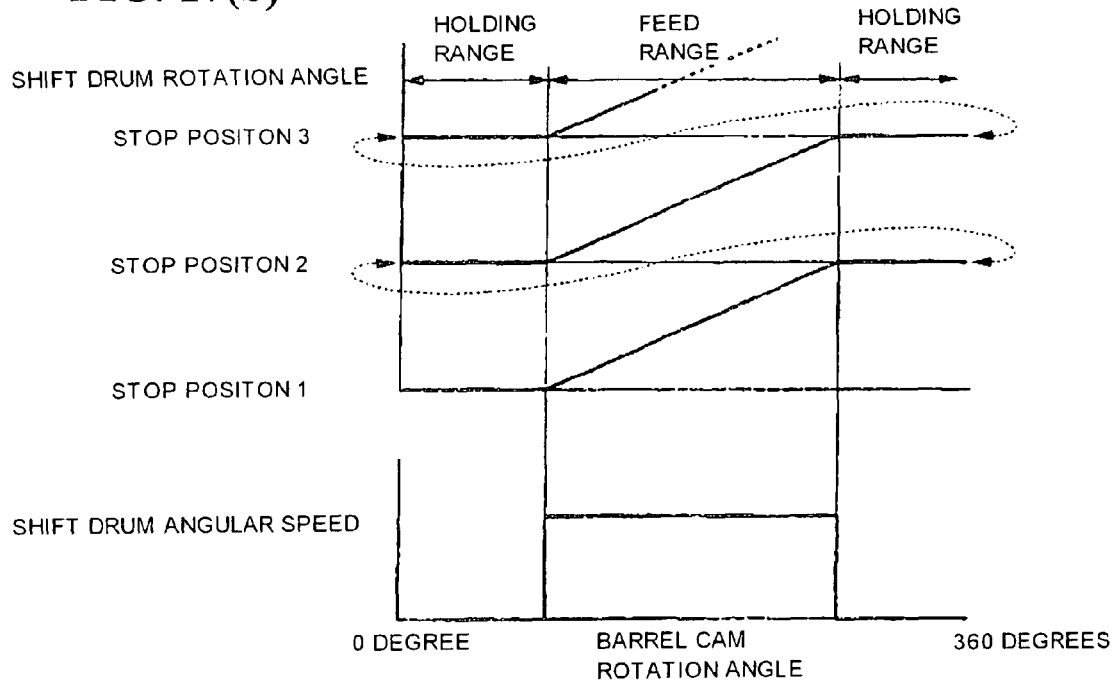

FIG. 17 is a graph showing the change in the rotation angle and the rotation angular speed of the shift drum 24a with respect to the rotation angle of the barrel cam 122. In the case where the respective ranges 129a and 129b of the cam grooves 129 of the barrel cam 122 are smoothly connected via the curve portion 129c (see FIG. 17(a)), the change in the rotation angle of the shift drum 24a, and the rise-up in the rotation angular speed of the shift drum 24a before and after the variable range 129b become more gentle compared with the case where the cam grooves 129 are linearly connected between the ranges 129a and 129b with no presence of the curve portion 129c (see FIG. 17(b)).

The inertia torque of the shift drum 24a upon the upshifting and the downshifting to suppress the load exerted to the components of the mechanisms. The position at which the barrel cam 122 performs the single rotation becomes the initial position of the shift position one stage upshifted or downshifted, from where the shifting operation may be continued.

In the twin clutch type transmission 23 connected to the engine 13, the first and second hydraulic disk clutches 51a, 51b for generating a predetermined engagement force by displacing the pressure plates 52a, 52d under an externally supplied oil pressure in an axial direction are coaxially provided to be adjacent with each other, and the inner and outer shafts 43, 44 of the main shaft 28 as a coaxial dual structure are connected to the respective disk clutches 51a, 51b coaxially. The ball bearing 73 fixed to the transmission case 22 with the holder plate 75 pierces the left end portion of the inner shaft 43 so as to be supported, and further to be tightened and fixed to the ball bearing 73 with the locknut 74 screwed with the leading end of the left end portion.

In the aforementioned structure, when the main shaft 28 having the coaxial dual structure is installed in the transmission case 22, the left end portion of the inner shaft 43 is rotatably supported via the ball bearing 73, and the outer shaft 44 is installed while regulating the axial movement. This allows easy installation of the main shaft 28 to the transmission case 22, and secures the shaft end portion to be held in the transmission case 22 in a simple and compact manner.

In the twin clutch type transmission 23, the ball bearing 82 that supports the counter shaft 29 in parallel with the main shaft 28 is fixed to the transmission case 22 such that the ball bearing 73 for the inner shaft 43 and the ball bearing 82 for the counter shaft 29 may be fixed to the transmission case 22 with the same holder plate 75 of the ball bearing 73, thus reducing the number of components and man-hour for assembly.

In the twin clutch type transmission 23, the locknut 74 screwed with the inner shaft is covered with the seal cap 76 from the outside of the transmission case 22. The through hole formed in the shaft end portion of the transmission case 22 may be sealed while enabling the tightening operation of the locknut 74 outside the transmission case.

In the twin clutch type transmission 23, the disk clutches 51a, 51b include the oil pressure chambers 54a, 54b at engagement side for applying the pressing force toward the clutch engagement side to the pressure plates 52a, 52d, and the oil pressure chambers 55a, 55b at disengagement side for applying the pressing force toward the clutch disengagement side to the pressure plates 52a, 52d to compensate the pressure resulting from the returning operation. A plurality of the in-shaft oil passages 115, 116, 117 in communication with any one of the oil pressure chambers 54a, 54b, 55a are formed at one side of the inner shaft 43, which are arranged in the order from the center of the inner shaft 43 to be used for the oil pressure chamber 54b at the engagement side, the oil pressure chamber 55a at the disengagement side, and the oil pressure chamber 54a for the engagement side. The in-shaft oil passages 115 and 117 for the oil pressure chambers 54a, 54b at engagement side, which become relatively high pressure, are apart from each other, and the in-shaft oil passage 116 for the oil pressure chamber 55a at the disengagement side, which becomes relatively low pressure, is interposed therebetween. This may disperse the pressure increase in inner shaft 43 to the appropriate pressure, contributing to the efficient operation of the transmission.

The present invention is not limited to the aforementioned embodiment, but may be applied to various types of internal combustion engine, for example, a single-cylinder engine, V-type engine, longitudinal type engine having the crankshaft line along the longitudinal direction, and the like. The present invention is applicable to three- or four-wheeled vehicle of saddle-ride type, or scooter type vehicle equipped with the low-floor footstool in addition to the motorcycle.

The structures of the embodiment as an example of the present invention apply to the four-wheeled vehicle. It is to be understood that the present invention may be modified into various forms without departing from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch type transmission operatively connected to an engine, comprising:
    first and second hydraulic disk clutches, for generating a predetermined engagement force by displacing a pressure member under an externally supplied oil pressure in an axial direction, are coaxially provided to be adjacent to each other, and an inner shaft and an outer shaft forming a coaxial dual structure are connected to the respective disk clutches coaxially;
    a transmission case having an opening at one end thereof;
    a left end portion of the inner shaft projects into the opening in the transmission case by a predetermined distance;
    a first bearing supporting the left end portion of the inner shaft projecting from the opening in the transmission case;
    a second bearing for supporting an end portion of a counter shaft in parallel with the inner and outer shafts; and
    a holder plate provided with a single hole on only one corner thereof,
    the holder plate being arranged on only one side of the counter shaft and being fixed on an inside of a left outer side wall of the transmission case with only a single bolt passing from an inside of the transmission case through the single hole on the only one corner thereof, such that an outer race of the first bearing is tightened to be fixed by a stepped portion formed in the left outer side wall of the transmission case; and
    a nut further tightening and fixing the first bearing to the left end portion of the inner shaft, said nut being accessible from outside the transmission case.

2. The twin clutch type transmission according to claim 1, wherein the nut screwed with the inner shaft is covered with a cap from outside of the transmission case, and the cap is covered by a detachable sprocket cover.

3. The twin clutch type transmission according to claim 1, wherein
    the first hydraulic disk clutch includes a first engagement side oil pressure chamber for independently applying an engaging force directed to a clutch engagement side to the pressure member, and a first disengaging side oil pressure chamber for independently applying a disengaging force directed to a clutch disengagement side to the pressure member to compensate for pressure caused by a return operation;
    the second hydraulic disk clutch includes a second engagement side oil pressure chamber for independently applying an engaging force directed to a clutch engagement side to the pressure member, and a second disengaging side oil pressure chamber for independently applying a disengaging force directed to a clutch disengagement side to the pressure member to compensate for pressure caused by a return operation;
    a plurality of in-shaft oil passages being formed at one side of the inner shaft and arranged coaxially from a center of the inner shaft in a coaxial order;
    a first inner in-shaft oil passage being in communication with the first engagement side oil pressure chamber with an oil passage being in communication with the first disengagement side oil pressure chamber;
    a second in-shaft oil passage being arranged coaxially adjacent to the first inner in-shaft oil passage, said second in-shaft oil passage being in communication with the second pressure compensation oil pressure chamber with a third in-shaft oil passage being arranged coaxially adjacent to the second in-shaft oil passage, said third in-shaft oil passage being in communication with the second clutch disengagement side oil pressure chamber;
    wherein each of the first and second clutches is selectively individually switched by continuing or discontinuing a supply of oil pressure to the first inner in-shaft oil passage, the oil passage, the second in-shaft oil passage or the third in-shaft oil passage.

4. The twin clutch type transmission according to claim 1, wherein the twin clutches are coaxially disposed adjacent to each other, and connection of each of the clutches is individually switched switchable by continuing or discontinuing a supply of pressure from a hydraulic pressure feed unit.

5. The twin clutch type transmission according to claim 1, wherein the inner shaft includes a projecting portion, and
    wherein the nut is mounted on said projecting portion for retaining the left end portion of the inner shaft relative to the first bearing.

6. A twin clutch type transmission adapted to be operatively connected to an engine comprising:
    first and second hydraulic disk clutches for generating a predetermined engagement force by displacing pressure members under an externally supplied oil pressure in an axial direction, the first and second hydraulic disk clutches are coaxially provided to be adjacent with each other;
    a transmission case having an opening at one end thereof;
    an inner shaft and an outer shaft forming a coaxial dual structure, the inner shaft and the outer shaft being connected to the respective disk clutches coaxially;
    a left end portion of the inner shaft projects into the opening in the transmission case by a predetermined distance;
    a first bearing supporting the left end portion of the inner shaft projecting from the opening in the transmission case;
    a second bearing for supporting an end portion of a counter shaft in parallel with the inner and outer shafts; and
    a holder plate provided with a single hole on only one corner thereof,
    the holder plate being arranged on only one side of the counter shaft and being fixed on an inside of a left outer side wall of the transmission case with only a single bolt passing from an inside of the transmission case through the single hole on the only one corner thereof, such that an outer race of the first bearing is tightened to be fixed by a stepped portion formed in the left outer side wall of the transmission case;
    the first bearing having one edge that pierces a left end portion of the inner shaft so as to be supported, wherein an outer race of the first bearing is tightened between a right facing surface of the circular stepped portion formed on the inside of the left outer side wall and a left facing surface of the holder plate; and
    a securing member for tightening and fixing the left end portion of the inner shaft projecting from the opening in the transmission case relative to the first bearing, said securing member being accessible from outside the transmission case.

7. The twin clutch type transmission according to claim 6, wherein the securing member is a nut screwed with the inner shaft, said nut being covered with a cap from outside of the transmission case, and the cap is covered by a detachable sprocket cover.

8. The twin clutch type transmission according to claim 6, wherein
    the first hydraulic disk clutch includes a first engagement side oil pressure chamber for independently applying an engaging force directed to a clutch engagement side to the pressure member, and a first disengaging side oil pressure chamber for independently applying a disengaging force directed to a clutch disengagement side to the pressure member to compensate for pressure caused by a return operation;

the second hydraulic disk clutch includes a second engagement side oil pressure chamber for independently applying an engaging force directed to a clutch engagement side to the pressure member, and a second disengaging side oil pressure chamber for independently applying a disengaging force directed to a clutch disengagement side to the pressure member to compensate for pressure caused by a return operation;

a plurality of in-shaft oil passages being formed at one side of the inner shaft and arranged coaxially from a center of the inner shaft in a coaxial order;

a first inner in-shaft oil passage being in communication with the first engagement side oil pressure chamber with an oil passage being in communication with the first disengagement side oil pressure chamber;

a second in-shaft oil passage being arranged coaxially adjacent to the first inner in-shaft oil passage, said second in-shaft oil passage being in communication with the second pressure compensation oil pressure chamber with a third in-shaft oil passage being arranged coaxially adjacent to the second in-shaft oil passage, said third in-shaft oil passage being in communication with the second clutch disengagement side oil pressure chamber;

wherein each of the first and second clutches is selectively individually switched by continuing or discontinuing a supply of oil pressure to the first inner in-shaft oil passage, the oil passage, the second in-shaft oil passage or the third in-shaft oil passage.

9. The twin clutch type transmission according to claim 6, wherein the twin clutches are coaxially disposed adjacent to each other, and connection of each of the clutches is individually switchable by continuing or discontinuing a supply of pressure from a hydraulic pressure feed unit.

10. The twin clutch type transmission according to claim 6, wherein the inner shaft includes a projecting portion, and wherein the securing member is a nut mounted on said projecting portion of the inner shaft for retaining the left end portion of the inner shaft relative to the first bearing.

11. The twin clutch type transmission according to claim 1, wherein the outer race of the first bearing has an outer circumferential surface and a left facing surface disposed on a circular stepped portion formed on the inside of the left outer side wall of the transmission case, the second bearing has an outer race with an outer circumferential surface and a left facing surface disposed on another circular stepped portion formed on the inside of the left outer side wall of the transmission case, and the outer race of the second bearing is tightened between a right facing surface of the another circular stepped portion formed in the inside of the left outer side wall of the transmission case and the left facing surface of the holder plate.

12. The twin clutch type transmission according to claim 6, wherein the outer race of the first bearing has an outer circumferential surface and a left facing surface disposed on a circular stepped portion formed on the inside of the left outer side wall of the transmission case, the second bearing has an outer race with an outer circumferential surface and a left facing surface disposed on another circular stepped portion formed on the inside of the left outer side wall of the transmission case, and the outer race of the second bearing is tightened between a right facing surface of the another circular stepped portion formed in the inside of the left outer side wall of the transmission case and the left facing surface of the holder plate.

* * * * *